US012665281B2

(12) United States Patent
Yun et al.

(10) Patent No.: US 12,665,281 B2
(45) Date of Patent: Jun. 23, 2026

(54) BROADBAND ANTENNA DISPOSED IN VEHICLE

(71) Applicant: LG ELECTRONICS INC., Seoul (KR)

(72) Inventors: Changwon Yun, Seoul (KR); Yiseon Jeong, Seoul (KR); Yongkon Kim, Seoul (KR); Changil Kim, Seoul (KR); Cheolsoo Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 154 days.

(21) Appl. No.: 18/726,880

(22) PCT Filed: Jan. 7, 2022

(86) PCT No.: PCT/KR2022/000264
§ 371 (c)(1),
(2) Date: Jul. 5, 2024

(87) PCT Pub. No.: WO2023/132387
PCT Pub. Date: Jul. 13, 2023

(65) Prior Publication Data

US 2025/0105487 A1 Mar. 27, 2025

(51) Int. Cl.
*H01Q 1/00* (2006.01)
*H01Q 1/02* (2006.01)
*H01Q 1/32* (2006.01)

(52) U.S. Cl.
CPC ................ *H01Q 1/02* (2013.01); *H01Q 1/32* (2013.01); *H01Q 1/3275* (2013.01)

(58) Field of Classification Search
CPC .................................. H01Q 1/02; H01Q 1/38
See application file for complete search history.

(56) References Cited

U.S. PATENT DOCUMENTS

| | | | | |
|---|---|---|---|---|
| 10,448,538 | B1 * | 10/2019 | Gaul | H05K 7/20154 |
| 2016/0248893 | A1 * | 8/2016 | Kim | H04M 1/026 |
| 2018/0191056 | A1 * | 7/2018 | Billard | H01Q 1/1207 |
| 2020/0409436 | A1 * | 12/2020 | Watanabe | G06F 1/1698 |
| 2021/0151875 | A1 * | 5/2021 | Samardzija | H01Q 1/48 |

FOREIGN PATENT DOCUMENTS

| | | |
|---|---|---|
| CN | 212182511 U | 12/2020 |
| KR | 10-2020-0040148 A | 4/2020 |
| WO | WO 2021/225187 A1 | 11/2021 |

* cited by examiner

*Primary Examiner* — Eric S Ruppert
(74) *Attorney, Agent, or Firm* — Birch, Stewart, Kolasch & Birch, LLP

(57) ABSTRACT

An antenna module for a vehicle, the antenna module including a printed circuit board (PCB) including electronic components; a metal heat sink disposed below the PCB to absorb heat generated from at least one of the electronic components; a blower fan structure disposed above the PCB and having a blower fan to dissipate heat generated from the at least one of the electronic components; a dielectric carrier coupled to the blower fan structure and having a hole formed to correspond to an area occupied by the blower fan; and an antenna element formed as a metal pattern on a top of the dielectric carrier to radiate a radio signal.

20 Claims, 18 Drawing Sheets

(a)

(b)

BROADBAND ANTENNA DISPOSED IN VEHICLE

CROSS-REFERENCE TO RELATED APPLICATIONS

This application is the National Stage filing under 35 U.S.C. 371 of International Application No. PCT/KR2022/000264, filed on Jan. 7, 2022, which is hereby expressly incorporated by reference into the present application.

TECHNICAL FIELD

The present disclosure relates to a broadband antenna disposed in a vehicle. One particular implementation relates to an antenna module having a broadband antenna that is capable of operating in various communication systems, and to a vehicle having the same.

BACKGROUND ART

A vehicle may perform wireless communication services with other vehicles or nearby objects, infrastructures, or a base station. In this regard, various communication services may be provided using Long Term Evolution (LTE) communication, 5G communication, or WiFi communication technology.

In order to provide these various wireless communication services in a vehicle, an antenna may be disposed on a glass of the vehicle, above or below a roof of the vehicle. When the antenna is disposed on the glass of the vehicle, it may be implemented with a transparent antenna material. Meanwhile, when the antenna is disposed above or below the roof of the vehicle, an effect on a vehicle body and the roof of the vehicle may cause a change in antenna performance.

In this regard, there is a problem in that a vehicle body and a vehicle roof are formed of a metallic material to block radio waves. Accordingly, a separate antenna structure may be disposed on a top of the vehicle body or the vehicle roof. As another example, an antenna structure may be configured to be disposed below a vehicle body or roof.

A broadband antenna structure for a vehicle may generate more heat as a plurality of communication modules, such as 5G communication modules, are added. Additionally, as the antenna module for a vehicle is mounted to the top of the vehicle roof, temperature requirements may further increase. Accordingly, a heat dissipation structure using a cooling fan may be considered as a heat dissipation solution for an antenna module for a vehicle.

In this regard, the use of the cooling fan as the heat dissipation solution causes an insufficient antenna space due to a region occupied by structures such as the cooling fan and an air duct. Furthermore, a phenomenon occurs where the location of the cooling fan for the heat dissipation solution and the location of an antenna for optimal performance of an antenna element overlap each other. Due to the overlap between the location of the cooling fan and the location of the antenna, a difficulty in optimizing both antenna performance and heat dissipation performance is caused.

SUMMARY

The present disclosure is directed to solving those problems and other drawbacks. Another aspect of the present disclosure is to provide an antenna structure with improved heat dissipation performance.

Another aspect of the present disclosure is to provide an antenna module for a vehicle for optimizing both antenna performance and heat dissipation performance.

Another aspect of the present disclosure is to provide an antenna structure operating to cover a full band of 4G/5G low band (LB) while optimizing heat dissipation performance.

Another aspect of the present disclosure is to provide an antenna structure operating to cover a full band of 4G/5G low band (LB) and Wi-Fi and V2X communication bands while optimizing heat dissipation performance.

Another aspect of the present disclosure is to provide diversity or multi-input/multi-output (MIMO) through a plurality of antenna elements while maintaining heat dissipation performance.

Another aspect of the present disclosure is to provide a configuration that is capable of maintaining isolation below a certain level while improving antenna performance of a plurality of antenna elements.

Another aspect of the present disclosure is to provide an antenna structure for providing a wireless signal to an inner region of a vehicle even in case where the exterior of a vehicle body or roof is made of a metallic material.

Another aspect of the present disclosure is to improve antenna performance and heat dissipation performance while maintaining an overall height of an antenna module at a certain level or less.

Another aspect of the present disclosure is to provide a structure for improving heat dissipation performance and antenna performance while mounting an antenna system, which is capable of operating in a wide frequency band to support various communication systems, to a vehicle.

To achieve the above or other aspects or advantages, there is provided an antenna module mounted on a vehicle, including: a printed circuit board (PCB) on which electronic components are disposed; a heat sink disposed below the PCB and formed as a metal structure to absorb heat generated from at least one of the electronic components; a blower fan structure disposed above the PCB and having a blower fan disposed in an inner region thereof to dissipate heat generated from the at least one of the electronic components; and an antenna element formed as a metal pattern on a top of the dielectric carrier to radiate a radio signal to a top region, wherein an antenna region and a blower fan region may at least partially overlap each other.

According to an embodiment, the antenna module may further include a dielectric carrier coupled to the blower fan structure and having a hole formed to correspond to the blower fan. The antenna element may be formed as a metal pattern on a top of the dielectric carrier to radiate a radio signal to a top region.

According to an embodiment, the antenna element may include an upper metal pattern formed as a polygonal metal pattern and having an aperture region inside the metal pattern, and a side metal pattern connected perpendicularly to the upper metal pattern and formed on a side surface of the dielectric carrier to be tapered in width. The antenna element may further include a feed pattern formed on an end portion of the side metal pattern to feed a signal from the PCB to the upper metal pattern through the side metal pattern.

According to an embodiment, the antenna element may include: a first shorting pattern formed perpendicular to the upper metal pattern at one point of a first pattern of the upper metal pattern and configured to be coupled up to a ground; and a second shorting pattern formed perpendicular to the upper metal pattern at one point of a second pattern connected to the first pattern of the upper metal pattern and configured to be coupled up to the ground. The antenna element may be a first antenna type operating in a 4G band and a 5G band.

According to an embodiment, the antenna element may include an upper metal pattern formed as a polygonal metal pattern and having an aperture region formed inside the metal pattern to correspond to a hole of the dielectric carrier. The antenna element may further include a feed pattern formed perpendicular to the upper metal pattern at a first point of the upper metal pattern and configured to feed a signal from the PCB to the upper metal pattern.

According to an embodiment, the antenna element may further include a side metal pattern formed on a side surface of the dielectric carrier to be perpendicular to the upper metal pattern at a second point of the upper metal pattern, and spaced apart from a ground by a certain distance.

According to an embodiment, the upper metal pattern may include: a first metal pattern formed to be connected to the feed pattern; and a second metal pattern connected to the side metal pattern and having one end portion spaced apart from one end portion of the first metal pattern. Another end portion of the first metal pattern may be located to be closer to an end portion of the dielectric carrier than the one end portion of the first metal pattern. The antenna element may be a second antenna type that operates in 4G band, 5G band, Wi-Fi band, and V2X band.

According to an embodiment, the feed pattern may be accommodated in an inner space of a feed hole formed in the dielectric carrier to be connected to a metal pattern of the PCB, so that a signal is transmitted from the metal pattern of the PCB to the upper metal pattern of the antenna element.

According to an embodiment, the antenna module may further include a bottom cover disposed below the PCB and configured as a metal plate. The antenna module may further include a top cover fastened to the bottom cover and configured to accommodate the heat sink, the PCB, the blower fan, and the antenna element therein. A signal may be radiated from the antenna element to the top region of the antenna module through the top cover.

According to an embodiment, an air duct structure may be configured by forming an aperture region in one side region of the dielectric carrier such that air generated by the blower fan is discharged through the side region of the top cover. A radio signal may be radiated from the antenna element through a top region of the top cover.

According to an embodiment, the heat sink may include a plate configured to be fastened to the bottom cover, and a rib structure formed on a top region of the plate to be adjacent to the aperture region of the one side region of the dielectric carrier. Air generated by the blower fan may be discharged through a side region of the top cover via the aperture region and the rib structure.

According to an embodiment, the antenna module may further include a network access device (NAD) disposed on a rear region of the PCB and operably coupled to the antenna element to control a signal applied to the antenna element. The antenna module may further include a thermoelectric cooler (TEC) disposed between the NAD and the heat sink. The thermoelectric cooler may be disposed between the NAD and a plate of the heat sink.

According to an embodiment, heat emitted from the NAD may be dissipated to a bottom region of the antenna module through the thermoelectric cooler, a plate of the heat sink, and the bottom cover, and may thus be dissipated by air generated by the blower fan through a side region of the top cover via an aperture region and a rib structure.

According to an embodiment, the antenna element may be a first antenna formed on the dielectric carrier disposed on one side region of the PCB, and the antenna element may further include a second antenna formed on a second dielectric carrier disposed on another side region of the PCB. The NAD may apply a signal to one of the first antenna and the second antenna to receive a signal through the second antenna when quality of a signal received through the first antenna is below a threshold.

According to an embodiment, the NAD may perform a multi-input/multi-output (MIMO) or diversity operation through the first antenna and the second antenna in a first band. The NAD may perform the MIMO or diversity operation through the first antenna and the second antenna in a second band different from the first band when first signal quality of the first band is below a threshold.

According to an embodiment, a rear surface of the PCB may be coupled to a rear surface of an air duct structure of the dielectric carrier by hook structures. Holes formed in the PCB may be coupled to holes formed in the dielectric carrier by screw structures.

According to an embodiment, some of the front and side regions of the blower fan structure may be formed as a dielectric structure to radiate radio signals from the antenna element. A motor driving part, which is disposed at a center of the blower fan structure and formed of a metallic material, may be formed as a cylindrical structure with a certain diameter or less so as not to interfere with a radio signal from the antenna element.

A vehicle having an antenna module mounted thereon according to another aspect of the present disclosure may include an antenna module disposed below a roof of the vehicle and a processor disposed inside or outside the antenna module, and configured to communicate with at least one of an adjacent vehicle, a road side unit (RSU), and a base station. The antenna module may include: a printed circuit board (PCB) on which electronic components are disposed; a blower fan structure disposed above the PCB and having a blower fan disposed in an inner region thereof to dissipate heat generated from at least one of the electronic components; and an antenna element formed as a metal pattern on a top of the dielectric carrier to radiate a radio signal to a top region.

According to an embodiment, the antenna module may further include: a heat sink disposed below the PCB and formed of a metal structure to absorb heat generated from the at least one of the electronic components; and a dielectric carrier coupled to the blower fan structure and having a hole formed to correspond to the blower fan. The antenna element may be formed as a metal pattern on a top of the dielectric carrier to radiate a radio signal to a top region.

According to an embodiment, the antenna element may include an upper metal pattern formed as a polygonal metal pattern and having an aperture region formed inside the metal pattern to correspond to the hole of the dielectric carrier. The antenna element may further include a feed pattern formed perpendicular to the upper metal pattern at a first point of the upper metal pattern and configured to feed a signal from the PCB to the upper metal pattern. The antenna element may further include a side metal pattern formed on a side surface of the dielectric carrier to be perpendicular to the upper metal pattern at a second point of the upper metal pattern, and spaced apart from the ground by a certain distance.

According to an embodiment, the antenna module may further include a bottom cover disposed below the PCB and configured as a metal plate, and a top cover fastened to the bottom cover and configured to accommodate the heat sink, the PCB, the blower fan. The heat sink may include: a plate configured to be fastened to the bottom cover; and a rib structure formed in a top region of the plate to be adjacent to an aperture region formed in one side region of the dielectric carrier. Air generated by the blower fan may be discharged through a side region of the top cover via the aperture region and the rib structure, and a radio signal may be radiated from the antenna element through a top region of the top cover.

According to an embodiment, the antenna module may further include a network access device (NAD) disposed on a rear region of the PCB and operably coupled to the antenna element to control a signal applied to the antenna element. The antenna module may further include a thermoelectric cooler (TEC) disposed between the NAD and the heat sink. Heat emitted from the NAD may be dissipated to a bottom region of the antenna module through the thermoelectric cooler, the plate of the heat sink, and the bottom cover, and may thus be dissipated by air generated by the blower fan through a side region of the top cover via an aperture region and a rib structure.

According to an embodiment, the antenna element may be a first antenna formed on the dielectric carrier disposed on one side region of the PCB, and the antenna element may further include a second antenna formed on a second dielectric carrier disposed on another side region of the PCB. The NAD may apply a signal to one of the first antenna and the second antenna to receive a signal through the second antenna when quality of a signal received through the first antenna is below a threshold. The NAD may perform a multi-input/multi-output (MIMO) or diversity operation through the first antenna and the second antenna in a first band, and perform the MIMO or diversity operation through the first antenna and the second antenna in a second band different from the first band when first signal quality of the first band is below the threshold.

Advantageous Effects of Invention

The technical effects of such antenna module having the wideband antenna mounted on the vehicle and the vehicle equipped with the antenna module will be described as follows.

The present disclosure can provide an antenna structure with improved heat dissipation performance by disposing an antenna element such that a blower fan region and an antenna region overlap each other.

The present disclosure may propose an antenna module for a vehicle for optimizing both antenna performance and heat dissipation performance by disposing an antenna element above a blower fan structure.

According to the present disclosure, an antenna element can be designed in various shapes on a dielectric carrier on a top of a blower fan structure. Accordingly, an antenna structure operating to cover a full band of 4G/5G low band LB while optimizing heat dissipation performance can be provided.

According to the present disclosure, an antenna element can be designed in various shapes on a dielectric carrier on a top of a blower fan structure. This can result in covering a full band of 4G/5G low bands (LB) and Wi-Fi and V2X communication bands while optimizing heat dissipation performance.

According to the present disclosure, a plurality of antenna elements may be disposed on top of a plurality of heat dissipation fan structures. Accordingly, diversity or MIMO can be performed through the plurality of antenna elements while maintaining heat dissipation performance.

According to the present disclosure, a plurality of antenna elements may be disposed on one side region and another side region of a PCB, but may be disposed above a plurality of heat dissipation fan structures. This can result in providing a configuration capable of maintaining isolation below a certain level while improving antenna performance of the plurality of antenna elements.

According to the present disclosure, a bottom cover of an antenna module may be made of a metallic material and a top cover may be made of a non-metallic material. A heat sink, a dielectric carrier, and an antenna element may be disposed in a space defined between the bottom cover and the top cover. This can result in providing an antenna structure for providing a radio signal to an inner region of a vehicle even in case where the exterior of a vehicle body or roof is made of a metal material.

According to the present disclosure, a heat sink, a dielectric carrier, and an antenna element can be disposed in a space between a bottom cover and a top cover of an antenna module. Antenna performance and heat dissipation performance can be improved while maintaining an overall height of the antenna module below a certain level.

According to the present disclosure, a heat sink, a dielectric carrier, and an antenna element can be disposed in a space between a bottom cover and a top cover of an antenna module. Meanwhile, other antenna elements may be further disposed on a PCB where the dielectric carrier and antenna elements are disposed. Accordingly, a structure for improving heat dissipation performance and antenna performance while mounting on a vehicle an antenna system, which is capable of operating in a broad frequency band to support various communication systems, can be provided.

Further scope of applicability of the present disclosure will become apparent from the foregoing detailed description. It should be understood, however, that the detailed description and specific examples, such as the preferred embodiment of the present disclosure, are given by way of illustration only, since various modifications and alternations within the spirit and scope of the disclosure will be apparent to those skilled in the art.

DETAILED DESCRIPTION

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. A suffix "module" or "unit" used for elements disclosed in the following description is merely intended for easy description of the specification, and the suffix itself is not intended to give any special meaning or function. In describing the embodiments disclosed herein, moreover, the detailed description will be omitted when specific description for publicly known technologies to which the invention pertains is judged to obscure the gist of the present disclosure. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

An antenna system described herein may be mounted on a vehicle. Configurations and operations according to implementations may also be applied to a communication system, namely, antenna system mounted on a vehicle. In this regard, the antenna system mounted in the vehicle may include a plurality of antennas, and a transceiver circuit and a processor that control the plurality of antennas.

Figure 1A:
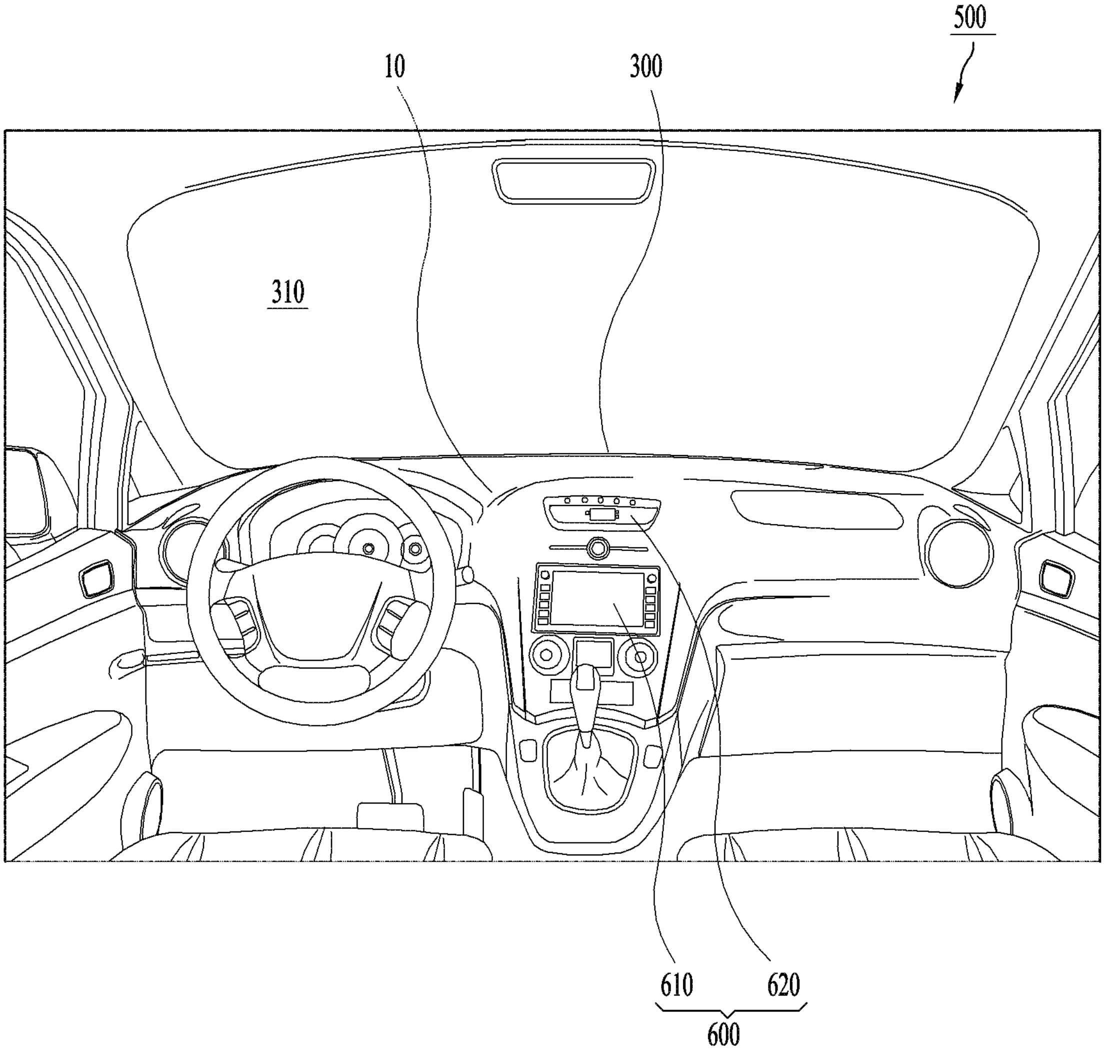
FIG. 1A is a diagram illustrating an internal configuration of a vehicle in accordance with one example.
Figure 1B:
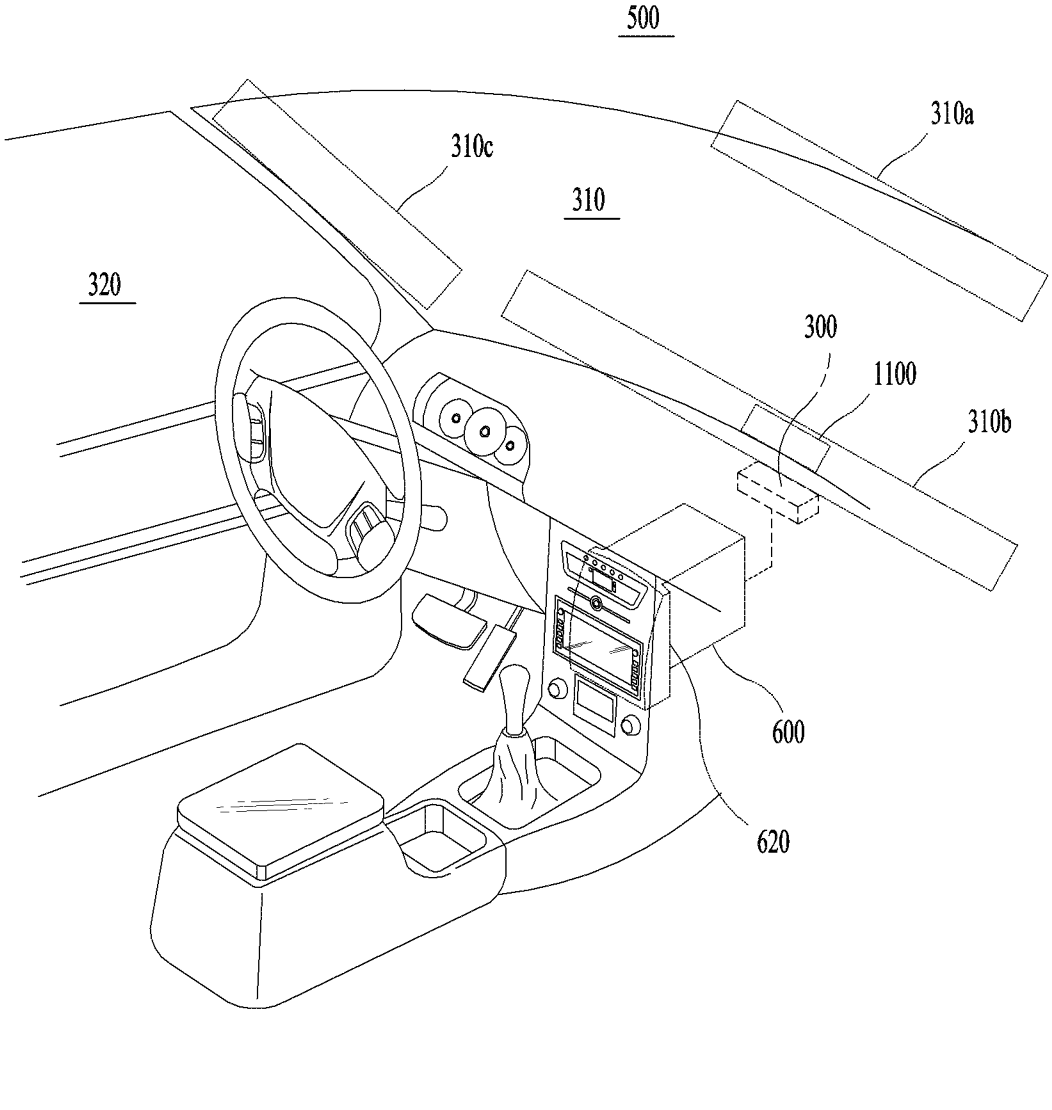
FIG. 1B is a lateral view illustrating the vehicle interior in accordance with the one example.

FIG. 1A is a diagram illustrating a vehicle interior in accordance with one example. FIG. 1B is a lateral view illustrating the vehicle interior in accordance with the one example.

As illustrated in FIGS. 1A and 1B, the present disclosure describes an antenna unit (i.e., an internal antenna system) 1000 capable of transmitting and receiving signals through GPS, 4G wireless communication, 5G wireless communication, Bluetooth, or wireless LAN. Therefore, the antenna unit (i.e., the antenna system) 1000 capable of supporting these various communication protocols may be referred to as an integrated antenna module 1000. The antenna system 1000 may include a telematics control unit (TCU) 300 and an antenna assembly 1100. For example, the antenna assembly 1100 may be disposed on a window of a vehicle.

The present disclosure also describes a vehicle 500 having the antenna system 1000. The vehicle 500 may include a dashboard and a housing 10 including the telematics control unit (TCU) 300, and the like. In addition, the vehicle 500 may include a mounting bracket for mounting the telematics control unit (TCU) 300.

The vehicle 500 may include the telematics control unit (TCU) 300 and an infotainment unit 600 configured to be connected to the telematics control unit 300. A portion of a front pattern of the infotainment unit 600 may be implemented in the form of a dashboard of the vehicle. A display 610 and an audio unit 620 may be included in the dashboard of the vehicle.

The antenna assembly 1100, namely, the antenna module 1100 in the form of a transparent antenna may be disposed at at least one of an upper region 310*a*, a lower region 310*b*, and a side region 310*c* of a front window 310. The antenna assembly 1100 may also be disposed at a side window 320, which is disposed at a side surface of the vehicle, in addition to the front window 310.

As illustrated in FIG. 1B, when the antenna assembly 1100 is disposed at the lower region 310*b* of the front window 310, it may be operably coupled to a TCU 300 disposed inside the vehicle. When the antenna assembly 1100 is disposed at the upper region 310*a* or the side region 310*c* of the front window 310, it may be operably coupled to a TCU disposed outside the vehicle. However, the present disclosure may not be limited to the TCU coupling configuration inside or outside the vehicle.

<V2X (Vehicle-to-Everything)>

V2X communication may include communications between a vehicle and all entities, such as V2V (Vehicle-to-Vehicle) which refers to communication between vehicles, V2I (Vehicle-to-Infrastructure) which refers to communication between a vehicle and an eNB or RSU (Road Side Unit), V2P (Vehicle-to-Pedestrian) which refers to communication between a vehicle and a terminal possessed by a person (pedestrian, cyclist, vehicle driver, or passenger), V2N (vehicle-to-network), and the like.

V2X communication may have the same meaning as V2X sidelink or NR V2X or may have, in a broader sense, a meaning including V2X sidelink or NR V2X.

V2X communication can be applied to various services, for example, forward collision warning, an automatic parking assist system, cooperative adaptive cruise control (CACC), control-loss warning, traffic queuing warning, safety warning, traffic vulnerable-area safety warning, emergency vehicle warning, curved-road driving speed warning, and traffic flow control.

V2X communication may be provided through a PC5 interface and/or a Uu interface. In this case, specific network entities for supporting communications between a vehicle and all entities may exist in a wireless communication system supporting V2X communication. For example, the network entity may include a base station (eNB), a Road Side Unit (RSU), a terminal, or an application server (e.g., a traffic safety server).

In addition, a terminal performing V2X communication may refer to not only a general handheld UE but also a vehicle (V-UE), a pedestrian UE, an RSU of an eNB type, an RSU of a UE type, a robot equipped with a communication module, and the like.

V2X communication may be performed directly between terminals or may be performed through the network entity (entities). V2X operation modes may be classified according to a method of performing such V2X communication.

Terms used in V2X communication may be defined as follows.

A Road Side Unit (RSU) is a V2X service enabled device that can transmit and receive data to and from a moving vehicle using V2I service. The RSU also serves as a stationary infrastructure entity that supports V2X application programs, and may exchange messages with other entities that support V2X application programs. The RSU is a term frequently used in existing ITS specifications, and the reason for employing the term RSU in association with the 3GPP specifications is to read relevant documents in an easier manner in the ITS industry. The RSU is a logical entity that combines a V2X application logic with the functionality of an eNB (referred to as an eNB-type RSU) or a UE (referred to as a UE-type RSU).

A V2I Service is a type of V2X service, where one party is a vehicle whereas the other party is an entity belonging to an infrastructure. A V2P Service is also a type of V2X service, where one party is a vehicle and the other party is a device carried by a person (e.g., a portable terminal carried by a pedestrian, a cyclist, a driver, or an occupant other than the driver). A V2X Service is a type of 3GPP communication service that involves a transmitting or receiving device on a vehicle. The V2X service may further be divided into a V2V service, a V2I service, and a V2P service according to which partner is involved in communication for the V2X service.

V2X enabled UE is a UE that supports V2X service. The V2V Service is a type of V2X service, where both parties involved in communication are vehicles. V2V communication range is a direct communication range between two vehicles involved in the V2V service.

Figure 2A:
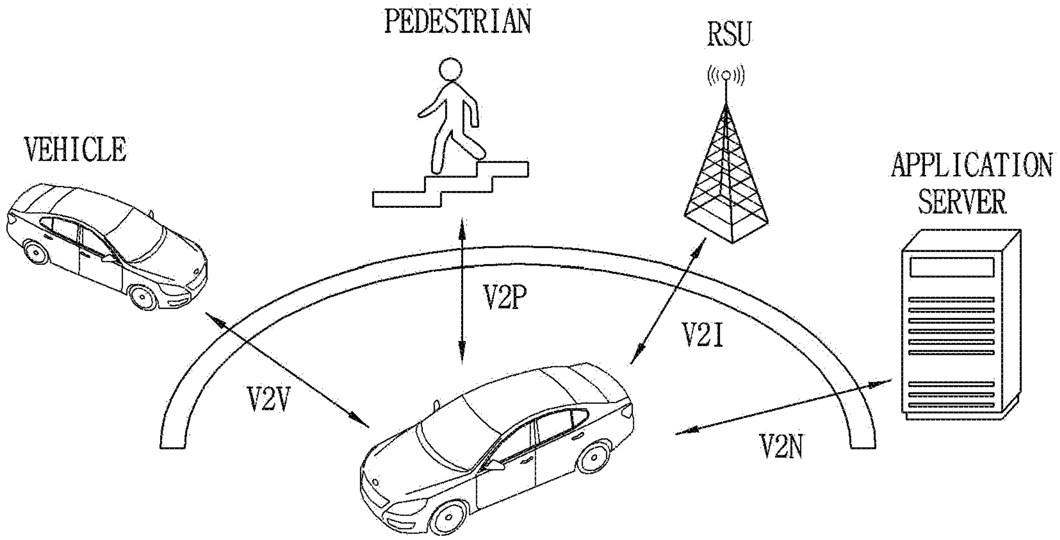
FIG. 2A illustrates types of V2X applications.

Four types of V2X applications called Vehicle-to-Everything (V2X), as described above, include (1) vehicle-to-vehicle (V2V), (2) vehicle-to-infrastructure (V2I), (3) vehicle-to-network (V2N), (4) vehicle-to-pedestrian (V2P). FIG. 2A illustrates types of V2X applications. Referring to FIG. 2A, the four types of V2X applications may use "cooperative awareness" to provide more intelligent services for end-users.

This means that, in order to provide more intelligent information, such as cooperative collision warning or autonomous traveling, entities, such as vehicles, roadside-based facilities, application servers and pedestrians, may collect knowledge of involved local environments (e.g., information received from nearby vehicles or sensor equipment) to process and share the corresponding knowledge.

<Nr V2X>

In 3GPP Releases 14 and 15, support of the V2V and V2X services in LTE has been introduced in order to extend the 3GPP platform to the automotive industry.

Requirements for support of enhanced V2X use cases are largely organized into four use case groups.

(1) Vehicles Platooning enables the vehicles to dynamically form a platoon traveling together. All the vehicles in the platoon obtain information from the leading vehicle to manage this platoon. These information allow the vehicles to drive closer than normal in a coordinated manner, going to the same direction and traveling together.

(2) Extended Sensors enable the exchange of raw or processed data gathered through local sensors or live video images among vehicles, road site units, devices of pedestrians and V2X application servers. The vehicle can recognize an environment much more than through detection by its sensor and can recognize a local situation as a whole in a more extensive manner. A high data transmission rate is one of primarily features of the extended sensor.

(3) Advanced Driving enables semi-automatic or fully-automatic driving. The advanced driving enables each vehicle and/or each RSU to share self-recognition data obtained from a local sensor with a nearby vehicle and to synchronize and adjust a trajectory or a maneuver. Each vehicle shares its intention to drive with a nearby vehicle.

(4) Remote driving serves to enable a remote driver or a V2X application program to drive a remotely-located vehicle in a dangerous environment by him/herself or itself or instead of an occupant who cannot drive the remotely-located vehicle. In a case where a traffic environment is limitedly changed and a vehicle driving path is predictable such as in public transportation, driving based on cloud computing may be available. High reliability and low latency are main requirements for the remote driving.

A description to be given below may be applicable to all of NR SL (sidelink) and LTE SL, and when no radio access technology (RAT) is indicated, the NR SL is meant. Six operational scenarios considered in NR V2X may be considered as follows. In this regard, FIG. 2B illustrates a standalone scenario supporting V2X SL communication and an MR-DC scenario supporting V2X SL communication.

In particular, 1) in Scenario 1, gNB provides control/configuration for UE's V2X communication in both LTE SL and NR SL. 2) In Scenario 2, ng-eNB provides control/configuration for UE's V2X communication in both LTE SL and NR SL. 3) In Scenario 3, eNB provides control/configuration for UE's V2X communication in both LTE SL and NR SL. On the other hand, 4) in Scenario 4, the UE's V2X communication in the LTE SL and the NR SL is controlled/configured by Uu while the UE is configured with EN-DC. 5) In Scenario 5, the UE's V2X communication in the LTE SL and the NR SL is controlled/configured by Uu while the UE is configured in NE-DC. 6) In Scenario 6, the UE's V2X communication in the LTE SL and the NR SL is controlled/configured by Uu while the UE is configured in NGEN-DC.

Figure 2B:
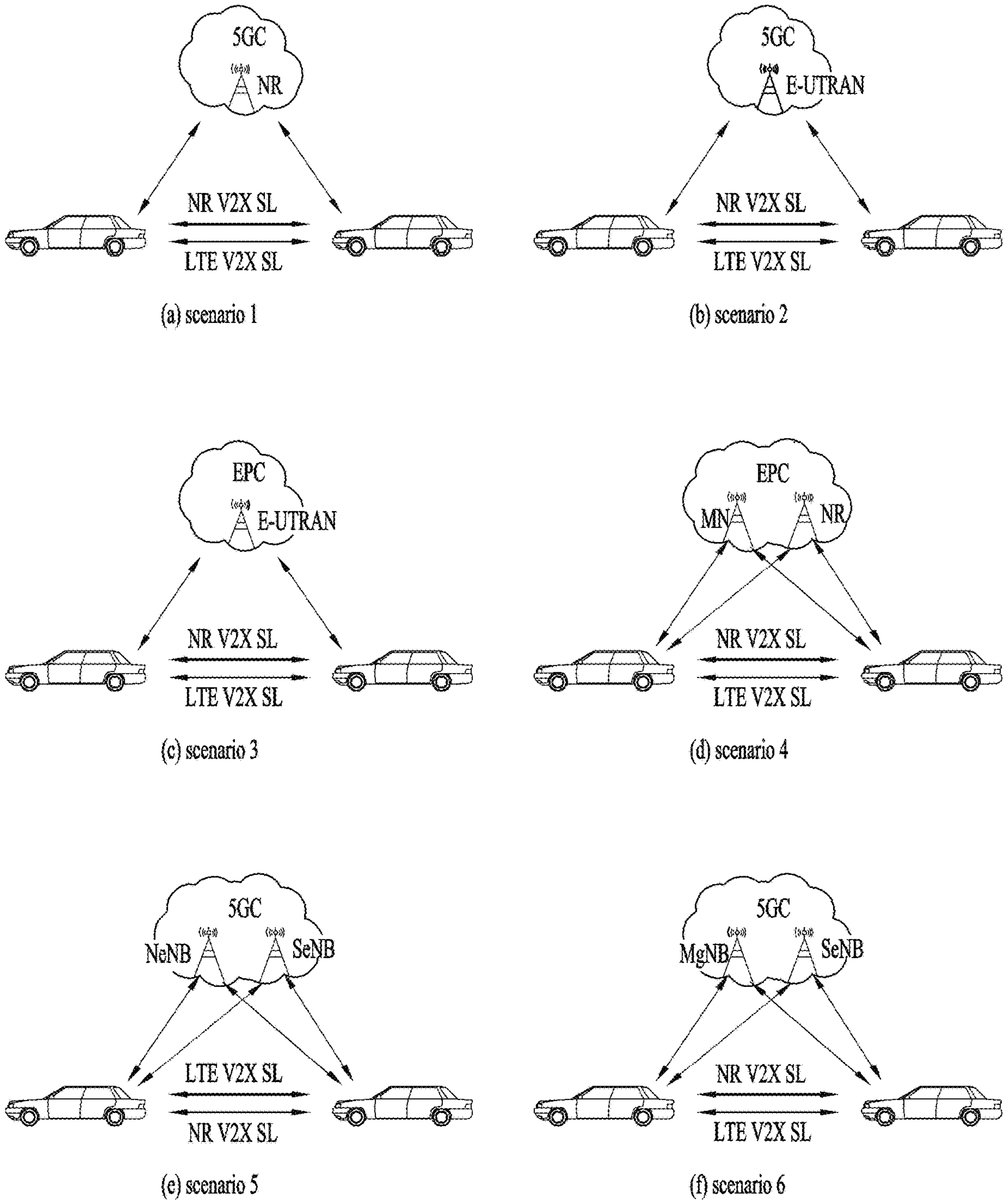
FIG. 2B is a view illustrating a standalone scenario supporting V2X SL communication and an MR-DC scenario supporting V2X SL communication.

In order to support the V2X communication, as illustrated in FIGS. 2A and 2B, the vehicle may perform wireless communication with eNB and/or gNB through an antenna system. The antenna system may be configured as an internal antenna system as illustrated in FIGS. 1A and 1B. The antenna system may alternatively be implemented as an external antenna system and/or an internal antenna system as illustrated in FIGS. 3A to 3C.

Figure 3A:
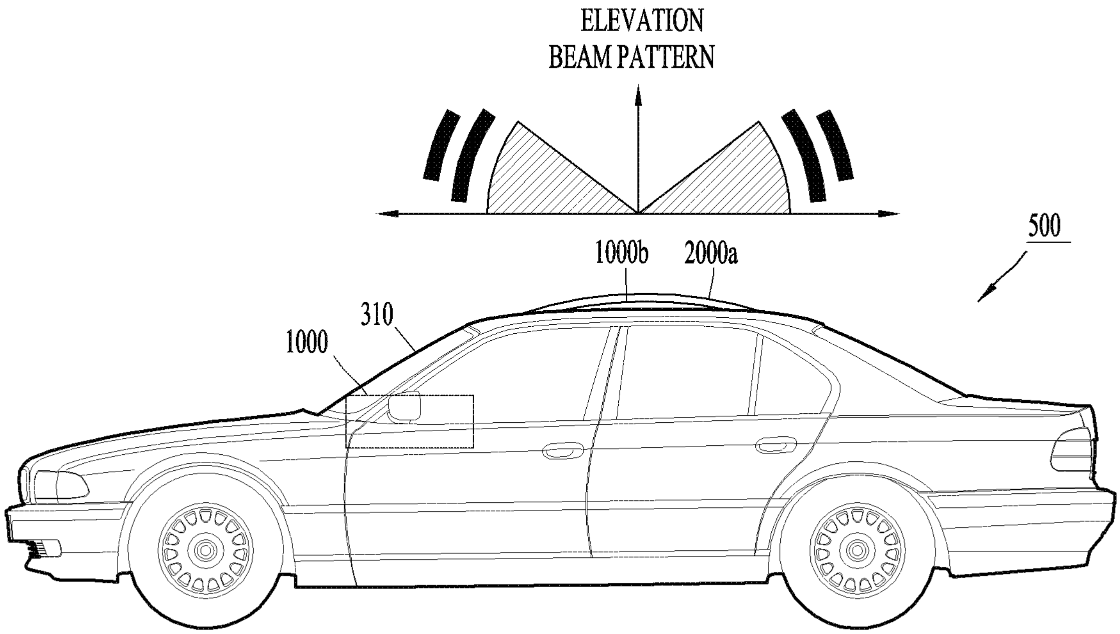
FIGS. 3A to 3C are views illustrating a structure for mounting an antenna system in a vehicle, to which the antenna system is mounted.
Figure 3B:
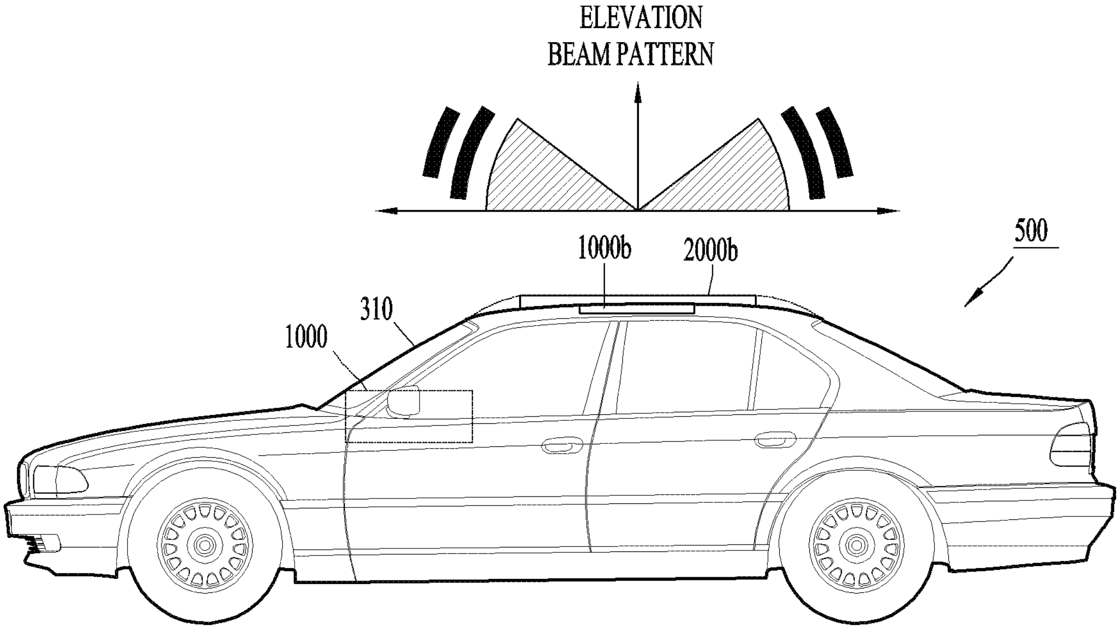
Figure 3C:
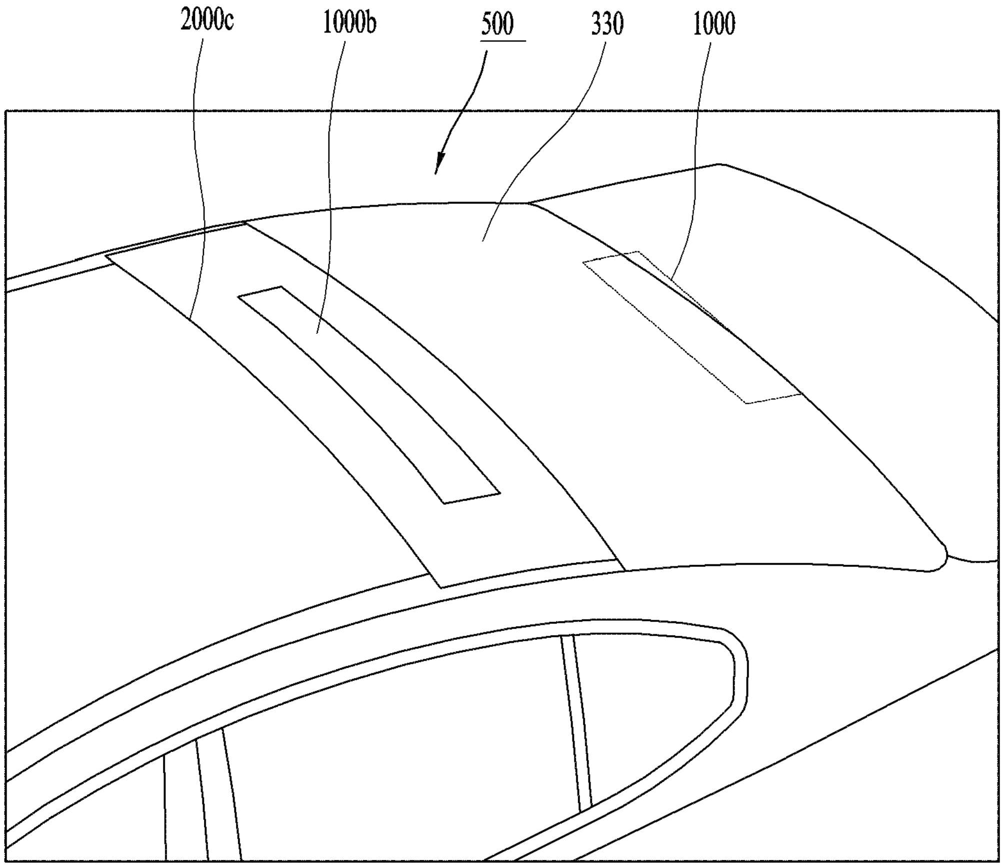

FIGS. 3A to 3C are views illustrating an example of a structure for mounting an antenna system on a vehicle, which includes the antenna system mounted on the vehicle. In this regard, FIGS. 3A to 3C illustrate a configuration capable of performing wireless communication through a transparent antenna disposed on the front window 310 of the vehicle. An antenna system 1000 including a transparent antenna may be disposed on a front window of a vehicle and inside the vehicle. Wireless communication may also be performed through a transparent antenna disposed on a side glass of the vehicle, in addition to the front window.

The antenna system for the vehicle that includes the transparent antenna can be combined with other antennas. Referring to FIGS. 3A to 3C, in addition to the antenna system 1000 implemented as the transparent antenna, a separate antenna system 1000*b* may be further configured. FIGS. 3A and 3B illustrate a structure in which the antenna system 1000*b*, in addition to the antenna system 1000, is mounted on or in a roof of the vehicle. On the other hand, FIG. 3C illustrates a structure in which the separate antenna system 1000*b*, in addition to the antenna system 1000, is mounted in a roof frame of a roof and a rear mirror of the vehicle.

Referring to FIGS. 3A to 3C, in order to improve the appearance of the vehicle and to maintain a telematics performance at the time of collision, an existing shark fin antenna may be replaced with a flat antenna of a non-protruding shape. In addition, the present disclosure proposes an integrated antenna of an LTE antenna and a 5G antenna considering fifth generation (5G) communication while providing the existing mobile communication service (e.g., LTE).

Referring to FIG. 3A, the antenna system 1000 implemented as the transparent antenna may be disposed on the front window 310 of the vehicle and inside the vehicle. The second antenna system 1000*b* corresponding to an external antenna may be disposed on the roof of the vehicle. In FIG. 3A, a radome 2000*a* may cover the second antenna system 1000*b* to protect the second antenna system 1000*b* from an external environment and external impacts while the vehicle travels. The radome 2000*a* may be made of a dielectric material through which radio signals are transmitted/received between the second antenna system 1000*b* and a base station.

Referring to FIG. 3B, the antenna system 1000 implemented as the transparent antenna may be disposed on the front window 310 of the vehicle and inside the vehicle. One the other hand, the second antenna system 1000*b* corresponding to the external antenna may be disposed within a roof structure of the vehicle and at least part of the roof structure 2000*b* may be made of a non-metallic material. At this time, the roof structure 2000*b* of the vehicle except for the at least part made of the non-metallic material may be made of a dielectric material through which radio signals are transmitted/received between the antenna system 1000*b* and the base station.

Referring to FIG. 3C, the antenna system 1000 implemented as the transparent antenna may be disposed on the rear window 330 of the vehicle and inside the vehicle. The second antenna system 1000*b* corresponding to the external antenna may be disposed within the roof frame 2000*c* of the vehicle, and at least part of the roof frame 2000*c* may be made of a non-metallic material. At this time, the roof frame 2000*c* of the vehicle 500 except for the at least part made of the non-metallic material may be made of a dielectric material through which radio signals are transmitted/received between the second antenna system 1000*b* and the base station.

Referring to FIGS. 3A to 3C, antennas provided in the antenna system 1000 mounted on the vehicle may form a beam pattern in a direction perpendicular to the front window 310 or the rear window 330. Antenna provided in the second antenna system 1000 mounted on the vehicle may further define a beam coverage by a predetermined angle in a horizontal region with respect to the vehicle body.

Meanwhile, the vehicle 500 may include only the antenna unit (i.e., the internal antenna system) 1000 corresponding to the internal antenna without the antenna system 1000*b* corresponding to the external antenna.

Figure 4:
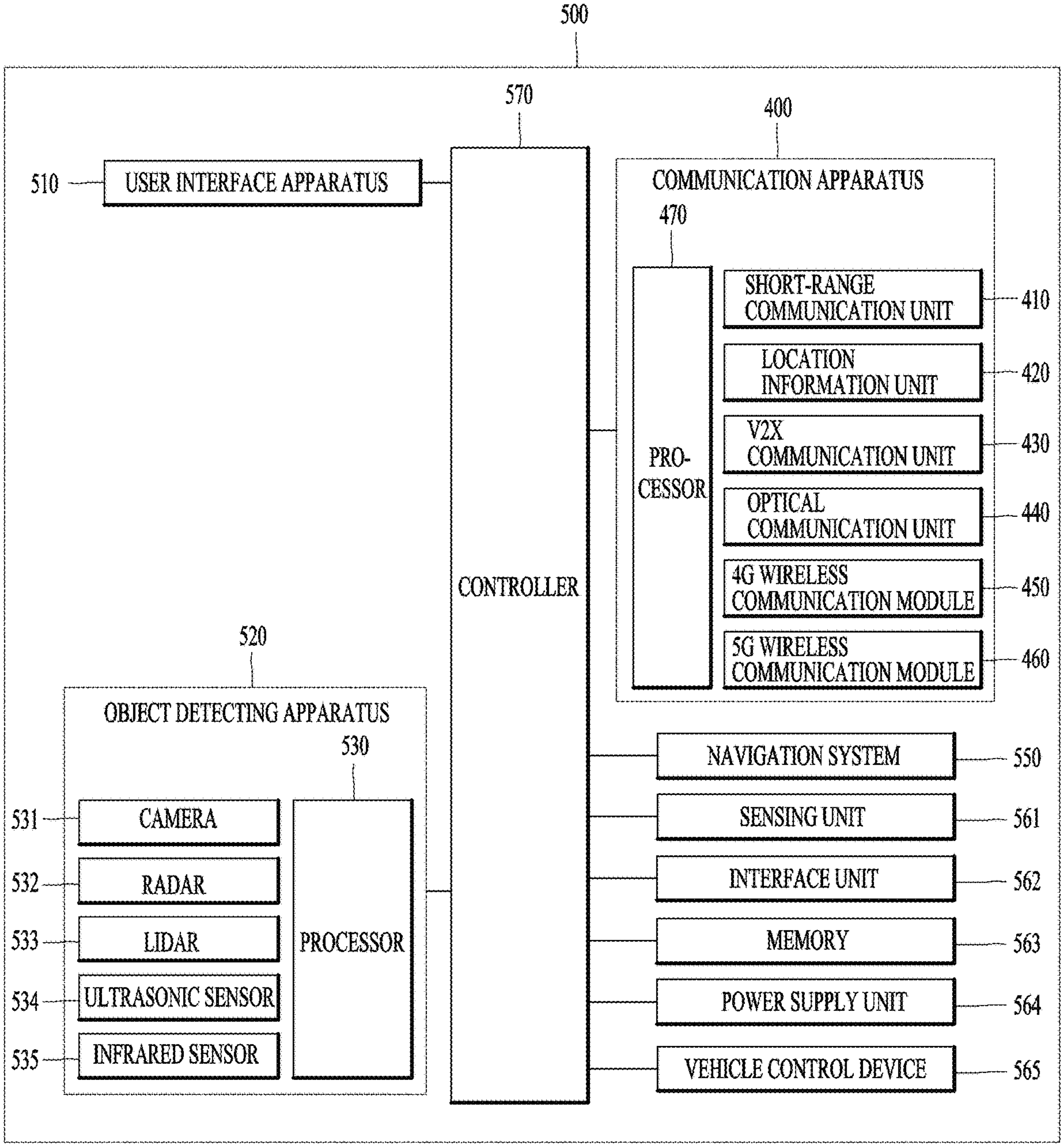
FIG. 4 is a block diagram illustrating a vehicle and an antenna system mounted to the vehicle in accordance with one example.

Meanwhile, FIG. 4 is a block diagram illustrating a vehicle and an antenna system mounted on the vehicle in accordance with an implementation.

The vehicle 500 may be an autonomous (driving) vehicle. The vehicle 500 may be switched into an autonomous driving mode or a manual mode (a pseudo driving mode) based on a user input. For example, the vehicle 500 may be switched from the manual mode into the autonomous mode or from the autonomous mode into the manual mode based on a user input received through a user interface apparatus 510.

In relation to the manual mode and the autonomous driving mode, operations such as object detection, wireless communication, navigation, and operations of vehicle sensors and interfaces may be performed by the telematics control unit mounted on the vehicle 500. Specifically, the telematics control unit mounted on the vehicle 500 may perform the operations in cooperation with the antenna module 300, the object detecting apparatus 520, and other interfaces. In some examples, the communication apparatus 400 may be disposed in the telematics control unit separately from the antenna system 300 or may be disposed in the antenna system 300.

The vehicle 500 may be switched into the autonomous mode or the manual mode based on driving environment information. The driving environment information may be generated based on object information provided by the object detecting apparatus 520. For example, the vehicle 500 may be switched from the manual mode into the autonomous driving mode or from the autonomous driving mode into the manual mode based on driving environment information generated in the object detecting apparatus 520.

For example, the vehicle 500 may be switched from the manual mode into the autonomous driving mode or from the autonomous driving mode into the manual mode based on driving environment information received through the communication apparatus 400. The vehicle 500 may be switched from the manual mode into the autonomous mode or from the autonomous module into the manual mode based on information, data or signal provided from an external device.

When the vehicle 500 travels in the autonomous mode, the autonomous vehicle 500 may travel under the control of an operation system. For example, the autonomous vehicle 500 may travel based on information, data or signal generated in a driving system, a parking exit (parking-lot leaving system, and a parking system. When the vehicle 500 is driven in the manual mode, the autonomous vehicle 500 may receive a user input for driving through a driving control apparatus. The vehicle 500 may travel based on the user input received through the driving control apparatus.

The vehicle 500 may include a user interface device 510, an object detection device 520, a navigation system 550, and a communication device 400. The vehicle may further include a sensing unit 561, an interface unit 562, a memory 563, a power supply unit 564, and a vehicle control device 565 in addition to the aforementioned apparatuses and devices. According to embodiments the vehicle 500 may include more components in addition to components to be explained in this specification or may not include some of those components to be explained in this specification.

The user interface apparatus 510 may be an apparatus for communication between the vehicle 500 and a user. The user interface apparatus 510 may receive a user input and provide information generated in the vehicle 500 to the user. The vehicle 510 may implement user interfaces (UIs) or user experiences (UXs) through the user interface apparatus 200.

The object detecting apparatus 520 may be a device for detecting an object located at outside of the vehicle 500. The object may be a variety of things associated with driving (operation) of the vehicle 500. In some examples, objects may be classified into moving objects and fixed (stationary) objects. For example, the moving objects may include other vehicles and pedestrians. The fixed objects may conceptually include traffic signals, roads, and structures, for example. The object detecting apparatus 520 may include a camera 521, a radar 522, a LiDAR 523, an ultrasonic sensor 524, an infrared sensor 525, and a processor 530. According to an embodiment, the object detecting apparatus 520 may further include other components in addition to the components described, or may not include some of the components described.

The processor 530 may control an overall operation of each unit of the object detecting apparatus 520. The processor 530 may detect an object based on an acquired image, and track the object. The processor 530 may execute operations, such as computing of a distance to the object, computing of a relative speed with respect to the object and the like, through an image processing algorithm.

According to an embodiment, the object detecting apparatus 520 may include a plurality of processors 530 or may not include any processor 530. For example, each of the camera 521, the radar 522, the LiDAR 523, the ultrasonic sensor 524 and the infrared sensor 525 may include the processor in an individual manner.

When the processor 530 is not included in the object detecting apparatus 520, the object detecting apparatus 520 may operate according to the control of a processor of an apparatus within the vehicle 500 or the controller 570.

The navigation system 550 may provide location information related to the vehicle based on information obtained through the communication apparatus 400, in particular, a location information unit 420. Also, the navigation system 550 may provide a path (or route) guidance service to a destination based on current location information related to the vehicle. In addition, the navigation system 550 may provide guidance information related to surroundings of the vehicle based on information obtained through the object detecting apparatus 520 and/or a V2X communication unit 430. In some examples, guidance information, autonomous driving service, etc. may be provided based on V2V, V2I, and V2X information obtained through a wireless communication unit operating together with the antenna system 1000.

The communication apparatus 400 may be an apparatus for performing communication with an external device. Here, the external device may be another vehicle, a mobile terminal, or a server. The communication apparatus 400 may perform the communication by including at least one of a transmitting antenna, a receiving antenna, and radio frequency (RF) circuit and RF device for implementing various communication protocols. The communication apparatus 400 may include a short-range communication unit 410, a location information unit 420, a V2X communication unit 430, an optical communication unit 440, a 4G wireless communication module 450, and a processor 470. According to an embodiment, the communication apparatus 400 may further include other components in addition to the components described, or may not include some of the components described.

The short-range communication unit 410 is a unit for facilitating short-range communications. The short-range communication unit 410 may construct short-range wireless area networks to perform short-range communication between the vehicle 500 and at least one external device. The location information unit 420 may be a unit for acquiring location information related to the vehicle 500. For example, the location information unit 420 may include a Global Positioning System (GPS) module or a Differential Global Positioning System (DGPS) module.

The V2X communication unit 430 may be a unit for performing wireless communication with a server (Vehicle to Infrastructure; V2I), another vehicle (Vehicle to Vehicle; V2V), or a pedestrian (Vehicle to Pedestrian; V2P). The V2X communication unit 430 may include an RF circuit in which protocols for communication with an infrastructure (V2I), communication between vehicles (V2V), and communication with a pedestrian (V2P) are executable. The optical communication unit 440 may be a unit for performing communication with an external device through the medium of light. The optical communication unit 440 may include an optical transmission part for converting an electric signal into an optical signal and transmitting the optical signal to the outside, and an optical reception part for converting the received optical signal into the electric signal. According to an embodiment, the optical transmission part may be formed integrally with lamps provided on the vehicle 500.

The wireless communication unit 460 is a unit that performs wireless communication with one or more communication systems through one or more antenna systems. The wireless communication unit 460 may transmit and/or receive a signal to and/or from a device in a first communication system through a first antenna system. In addition, the wireless communication unit may transmit and/or receive a signal to and/or from a device in a second communication system through a second antenna system. For example, the first communication system and the second communication system may be an LTE communication system and a 5G communication system, respectively. However, the first communication system and the second communication system may not be limited thereto, and may be changed according to applications.

In some examples, the antenna module 300 disposed in the vehicle 500 may include a wireless communication unit. In this regard, the vehicle 500 may be an electric vehicle (EV) or a vehicle that can be connected to a communication system independently of an external electronic device. In this regard, the communication apparatus 400 may include at least one of the short-range communication unit 410, the location information unit 420, the V2X communication unit 430, the optical communication unit 440, a 4G wireless communication module 450, and a 5G wireless communication module 460.

The 4G wireless communication module 450 may perform transmission and reception of 4G signals with a 4G base station through a 4G mobile communication network. In this case, the 4G wireless communication module 450 may transmit at least one 4G transmission signal to the 4G base station. In addition, the 4G wireless communication module 450 may receive at least one 4G reception signal from the 4G base station. In this regard, Uplink (UL) Multi-input/Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 460 may perform transmission and reception of 5G signals with a 5G base station through a 5G mobile communication network. Here, the 4G base station and the 5G base station may have a Non-Stand-Alone (NSA) architecture. The 4G base station and the 5G base station may be disposed in the Non-Stand-Alone (NSA) architecture. Alternatively, the 5G base station may be disposed in a Stand-Alone (SA) architecture at a separate location from the 4G base station. The 5G wireless communication module 460 may perform transmission and reception of 5G signals with a 5G base station through a 5G mobile communication network. In this case, the 5G wireless communication module 460 may transmit at least one 5G transmission signal to the 5G base station. In addition, the 5G wireless communication module 460 may receive at least one 5G reception signal from the 5G base station. In this instance, a 5G frequency band that is the same as a 4G frequency band may be used, and this may be referred to as LTE re-farming. In some examples, a Sub6 frequency band, which is a range of 6 GHz or less, may be used as the 5G frequency band. In contrast, a millimeter-wave (mmWave) band may be used as the 5G frequency band to perform wideband high-speed communication. When the mmWave band is used, the electronic device may perform beamforming for coverage expansion of an area where communication with a base station is possible.

Regardless of the 5G frequency band, in the 5G communication system, Multi-Input Multi-Output (MIMO) may be supported to be performed multiple times, in order to improve a transmission rate. In this instance, UL MIMO may be performed by a plurality of 5G transmission signals that are transmitted to a 5G base station. In addition, DL MIMO may be performed by a plurality of 5G reception signals that are received from the 5G base station.

In some examples, A state of dual connectivity (DC) to both the 4G base station and the 5G base station may be attained through the 4G wireless communication module 450 and the 5G wireless communication module 460. As such, the dual connectivity to the 4G base station and the 5G base station may be referred to as EUTRAN NR DC (EN-DC). When the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 450 and the 5G wireless communication module 460, respectively. Short-range communication between electronic devices (e.g., vehicles) may be performed between electronic devices (e.g., vehicles) using the 4G wireless communication module 450 and the 5G wireless communication module 460. In one embodiment, after resources are allocated, vehicles may perform wireless communication in a V2V manner without a base station.

Meanwhile, for transmission rate improvement and communication system convergence, Carrier Aggregation (CA) may be carried out using at least one of the 4G wireless communication module 450 and the 5G wireless communication module 460 and a WiFi communication module. In this regard, 4G+WiFi carrier aggregation (CA) may be performed using the 4G wireless communication module 450 and the Wi-Fi communication module 113. Or, 5G+WiFi CA may be performed using the 5G wireless communication module 460 and the Wi-Fi communication module.

In some examples, the communication apparatus 400 may implement a display apparatus for a vehicle together with the user interface apparatus 510. In this instance, the display apparatus for the vehicle may be referred to as a telematics apparatus or an Audio Video Navigation (AVN) apparatus.

The processor 470 of the communication apparatus 400 may correspond to a modem. In this regard, the RFIC and the modem may be referred to as a first controller (or a first processor) and a second controller (a second processor), respectively. Meanwhile, the RFIC and the modem may be implemented as physically separate circuits. Alternatively, the RFIC and the modem may be logically or functionally separated from each other on one physical circuit. The modem may perform control and signal processing for signal transmission and reception through different communication systems using the RFID. The modem 1400 may acquire control information from a 4G base station and/or a 5G base station. Here, the control information may be received through a physical downlink control channel (PDCCH), but may not be limited thereto.

The modem may control the RFIC 1250 to transmit and/or receive signals through the first communication system and/or the second communication system for a specific time interval and from frequency resources. Accordingly, the vehicle can be allocated resources or maintain a connected state through the eNB or gNB. In addition, the vehicle may perform at least one of V2V communication, V2I communication, and V2P communication with other entities using the allocated resources.

Meanwhile, referring to FIGS. 1A to 4, the antenna module mounted on the vehicle may be disposed inside the vehicle, on the roof of the vehicle, inside the roof, or inside the roof frame. In this regard, the antenna system disclosed herein may be configured to operate in a low band (LB), mid band (MB), and high band (HB) of a 4G LTE system and a SUB6 band of a 5G NR system. Additionally, the antenna system disclosed in the present disclosure may be configured to operate in a 2.4 GHz band and a 5 GHz band for Wi-Fi communication services.

Hereinafter, a broadband antenna structure (or wideband antenna structure) for a vehicle according to the present disclosure will be described. In this regard, a broadband antenna structure for a vehicle may generate more heat as a plurality of communication modules, such as 5G communication modules, are added. Additionally, as the antenna module for a vehicle is mounted to the top of the vehicle roof, temperature requirements may further increase. Accordingly, a heat dissipation structure using a cooling fan is considered as a heat dissipation solution for an antenna module for a vehicle.

In this regard, the use of the cooling fan as the heat dissipation solution results in an insufficient antenna space due to a region occupied by structures such as the cooling fan and an air duct. Furthermore, a phenomenon occurs where the location of the cooling fan for the heat dissipation solution and the location of an antenna for optimal performance of an antenna element overlap each other. Due to the overlap between the location of the cooling fan and the location of the antenna, a situation arises in which it is difficult to optimize both antenna performance and heat dissipation performance.

In this regard, the present disclosure will consider a blower fan structure by separating the same into a plurality of components. When a blower fan structure is physically separated into a plurality of components, the blower fan structure includes a dielectric mold and a motor driving part (fan driving part) made of a metallic material. Therefore, a dielectric structure such as the dielectric mold and an air duct structure formed on the dielectric structure may be made of non-metallic materials and may be recycled (shared) as an antenna region.

Figure 5:
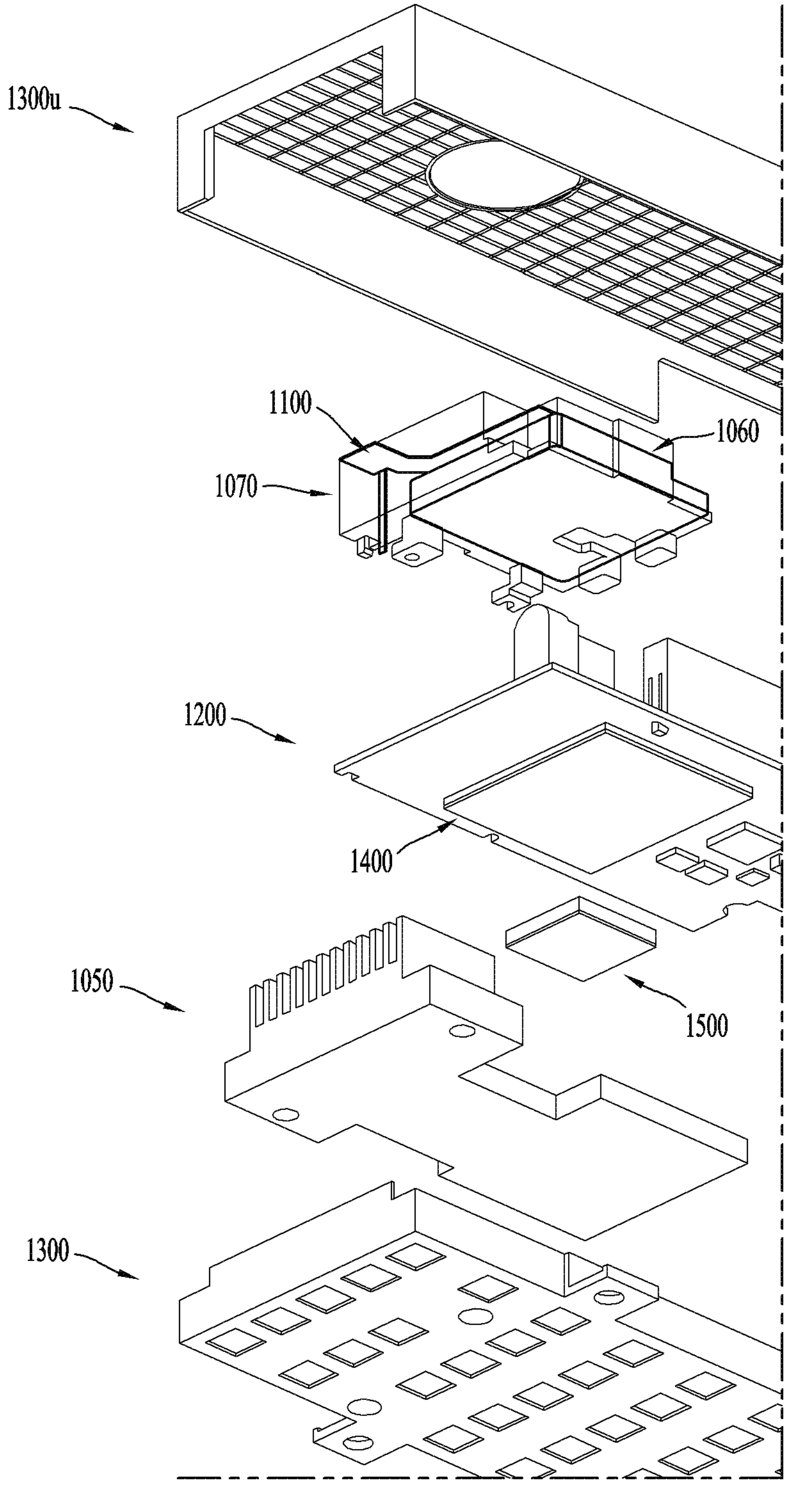
FIG. 5 is an inner perspective view illustrating each configuration of an antenna module that may be disposed on a vehicle according to the present disclosure.
Figure 6A:
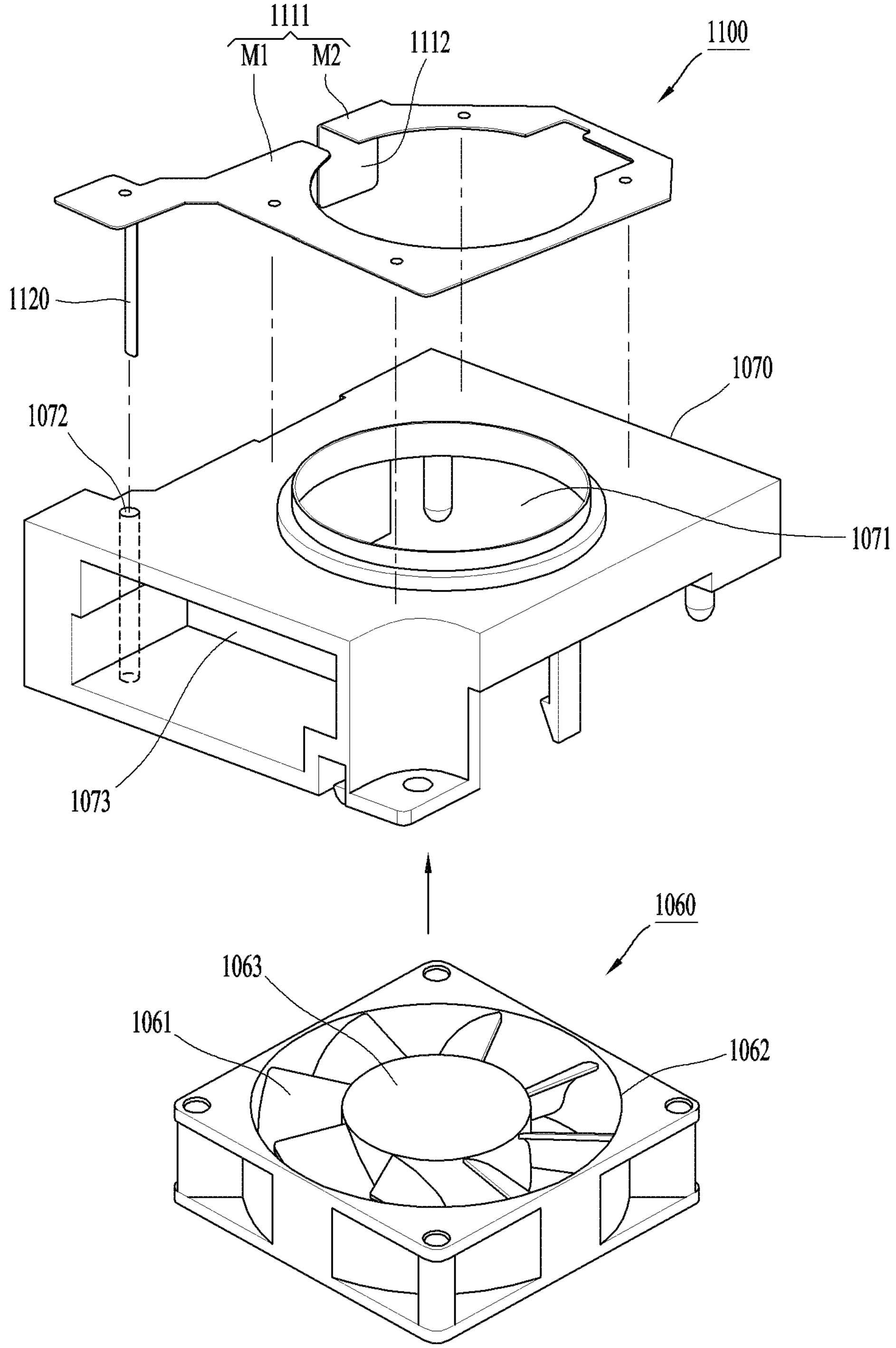
FIG. 6A illustrates a coupling structure of a blower fan and an antenna element, which may be disposed on a structure for supporting the blower fan, in the antenna module for a vehicle of FIG. 5.
Figure 6B:
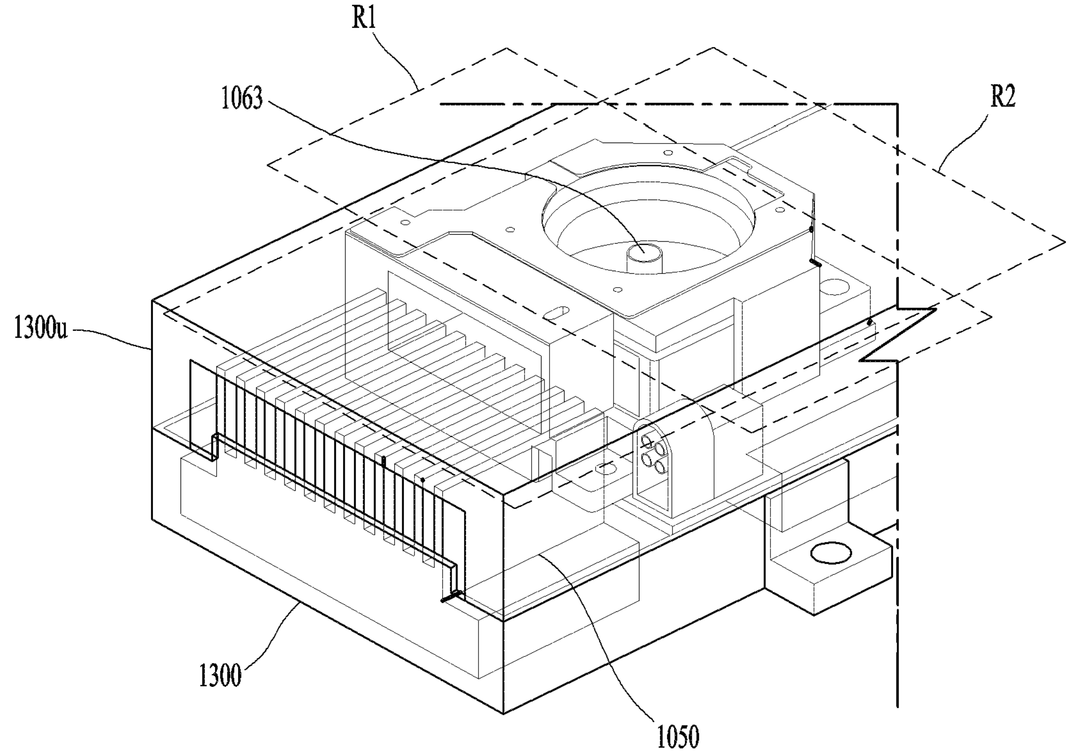
FIG. 6B illustrates a structure in which the coupling structure of the antenna structure of FIG. 6A shares the same region within the antenna module for a vehicle.

Accordingly, the present disclosure is to provide an antenna module for a vehicle to optimize both antenna performance and heat dissipation performance. In this regard, FIG. 5 is an inner perspective view illustrating each configuration of an antenna module that may be disposed on a vehicle according to the present disclosure. On the other hand, FIG. 6A illustrates a coupling structure of a blower fan and an antenna element, which may be disposed on a structure supporting the blower fan, in the antenna module for a vehicle of FIG. 5. FIG. 6B illustrates a structure in which the coupling structure of the antenna structure of FIG. 6A shares the same region within the antenna module for a vehicle.

Referring to FIG. 5, an antenna module 1000 for a vehicle according to the present disclosure may include a heat sink 1050, a blower fan structure 1060, a dielectric carrier 1070, and an antenna element 1100. The antenna module 1000 may further include a printed circuit board (PCB) 1200. The antenna module 1000 for the vehicle may include a bottom cover 1300 and a top cover 1300*u*.

In this regard, the antenna module 1000 may be disposed on the top of a roof structure of the vehicle as illustrated in FIG. 3A or may be disposed inside the roof structure of the vehicle as illustrated in FIGS. 3B and 3C. The bottom cover 1300 of the antenna module 1000 may be configured to be coupled to the roof structure of the vehicle. The antenna module 1000 may be configured such that the heat sink 1050, the PCB 1200, the blower fan structure 1060, the dielectric carrier 1070, and the antenna element 1100 are sequentially disposed on the top of the bottom cover 1300. However, the combination of the respective components sequentially disposed is not limited to this.

For example, in the antenna module 1000, at least one of the heat sink 1050, the PCB 1200, the blower fan structure 1060, and the dielectric carrier 1070 may be omitted or their disposition order may change. Additionally, the heat sink 1050 is not limited to being disposed on a bottom region (rear surface) of the PCB 1200, but may be partially disposed on a top region (front surface) of the PCB 1200.

Electronic components may be disposed on the PCB 1200. A transceiver circuitry such as an RF circuit and a baseband processor may be disposed on the PCB 1200. As another example, some processors, such as a baseband processor, and some of transceiver circuitries may be disposed on a telematics unit (TCU), separate from the PCB 1200. Other antenna elements may be disposed on a PCB, separate from the PCB 1200. Accordingly, the PCB 1200 may be referred to as a main PCB 1200, and the PCB on which other antenna elements are disposed may be referred to as an antenna PCB.

The heat sink 1050 may be disposed below the PCB 1200 to absorb heat. The heat sink 1050 may have a metal structure to absorb heat generated from at least one of electronic components.

The blower fan structure 1060 may be disposed above the PCB 1200 to dissipate heat. A blower fan that is configured to dissipate heat generated from at least one of those electronic components may be disposed in an inner region of the blower fan structure 1060.

The dielectric carrier 1070 may be configured to be coupled with the blower fan structure 1060. The dielectric carrier 1070 may be configured to have a hole 1071 formed to correspond to the blower fan.

The antenna element 1100 may be formed as a metal pattern on the top of the dielectric carrier 1070 to radiate a wireless signal to a top region.

Referring to FIG. 6A, the blower fan structure 1060 may be configured to be coupled to the dielectric carrier 1070 at a bottom region of the dielectric carrier 1070. Additionally, a radiator corresponding to the antenna element 1100 may be disposed on the top region (front surface) of the dielectric carrier 1070.

In this regard, some of the front region and side regions of the blower fan structure 1060 may be configured as a dielectric structure so that a wireless signal is radiated from the antenna element 1100. The blower fan structure 1060 may include a blower fan 1061, a hole 1062, and a motor driving part 1063.

The blower fan 1061 is configured to control an air flow so that heat generated from a NAD 1400 corresponding to the processor in FIG. 5 is discharged to the top region and side regions of the PCB 1200. The hole 1062 may be formed in a front surface portion of the blower fan structure 1060, and have a certain shape such that the blower fan 1061 can be accommodated therein.

Figure 7:
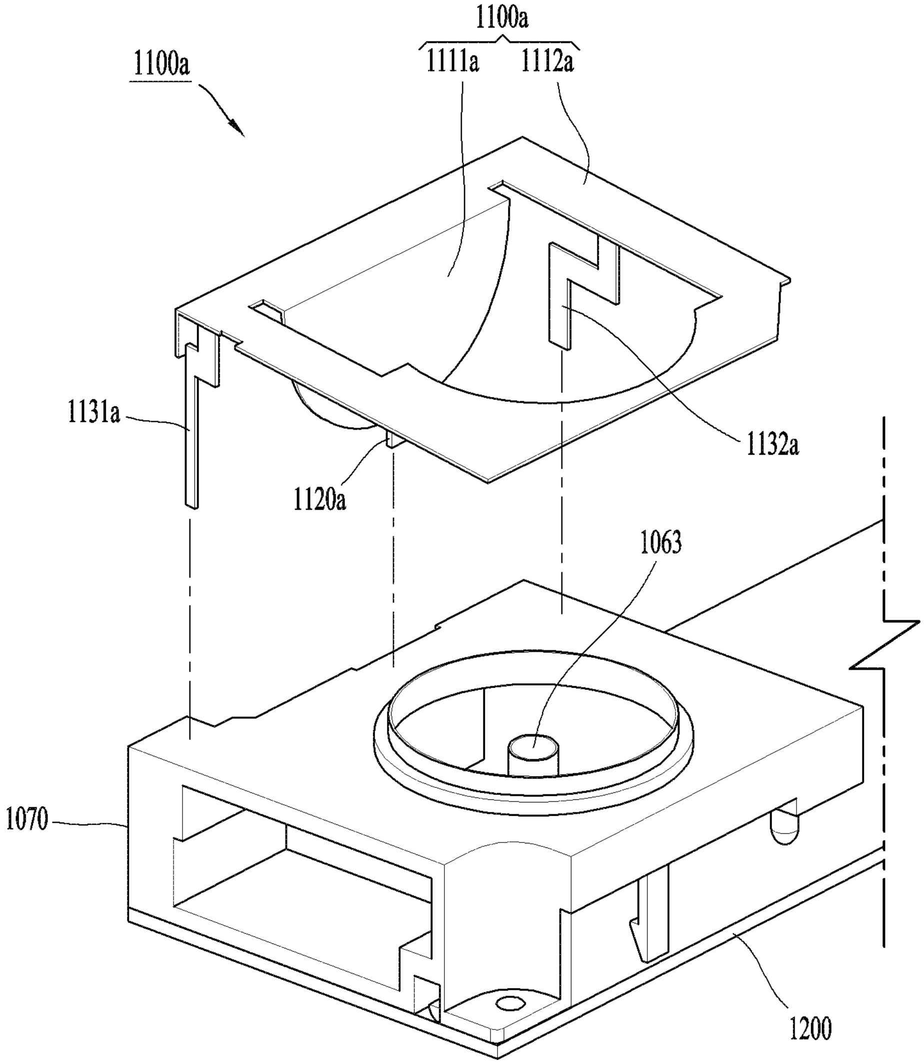
FIG. 7 illustrates a tapered monopole-shaped antenna element according to an embodiment of the present disclosure.
Figure 9:
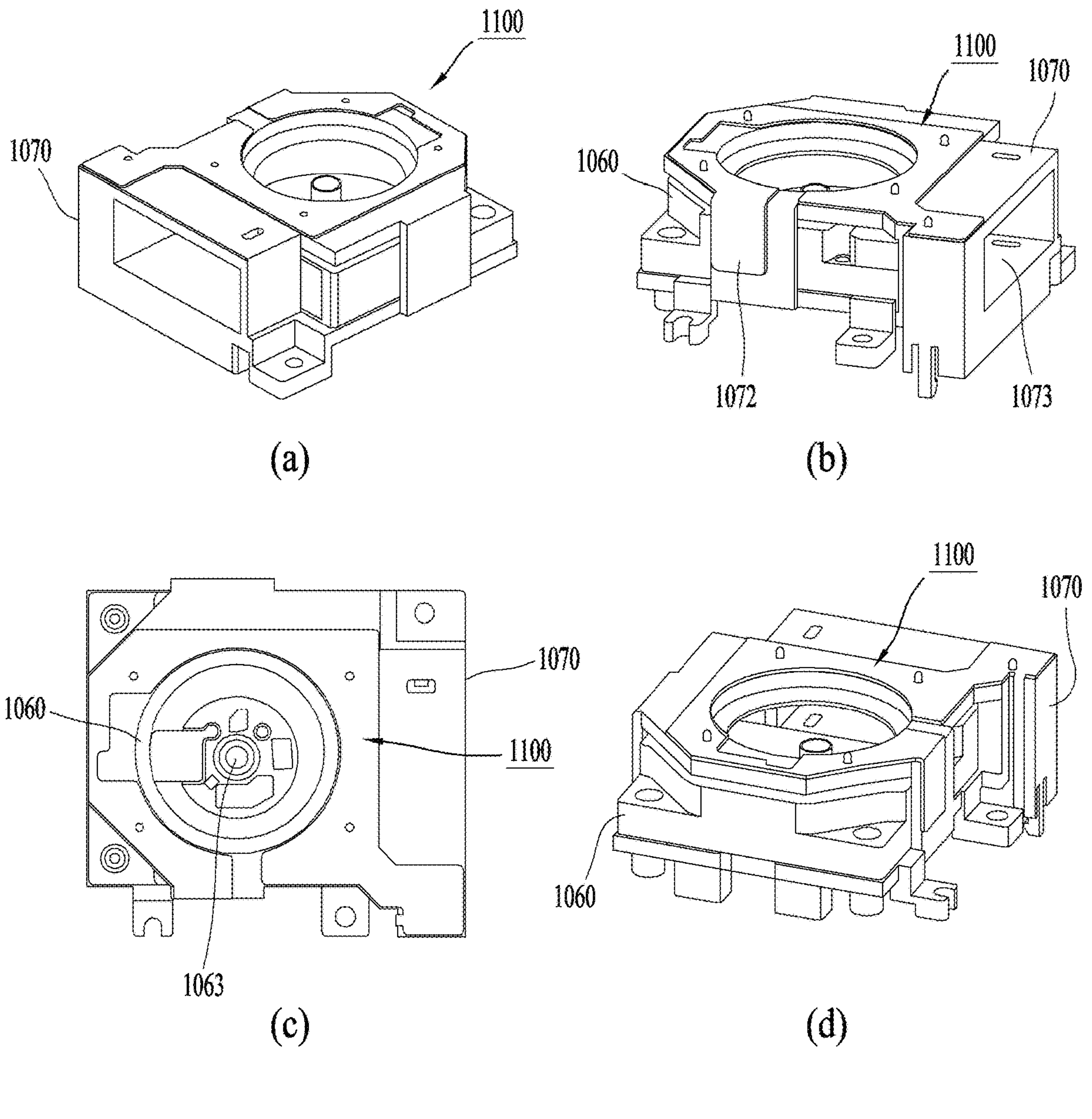
FIG. 9 illustrates a structure in which the loop-shaped antenna element of FIG. 8 is disposed on a dielectric carrier coupled to a blower fan structure.

Meanwhile, the motor driving part 1063 that is made of a metallic material and formed at the center of the blower fan structure 1060 may be formed in a cylindrical structure with a predetermined diameter or less so as not to interfere with a wireless signal from the antenna element 1100. The motor driving part 1063 may be configured to have a rotation shaft formed inside a cover of the front surface portion, as illustrated in FIGS. 7 and 9.

In this regard, the front region and side regions of the blower fan structure 1060 may be configured as a mold structure made of a dielectric material. Accordingly, the front region and side regions of the blower fan structure 1060 may be formed of the dielectric material so as not to interfere with a wireless signal irradiated from the antenna element 1100. The front region and side regions of the blower fan structure 1060 may be regions corresponding to an area where the antenna element 1100 is disposed.

Referring to FIGS. 5 to 6B, an antenna region R1 where the antenna element 1100 may be disposed may overlap a heat dissipation region R2 where the heat sink 1060 may be disposed. A network access device (NAD) 1400 may be disposed below the PCB 1200 corresponding to the region where the antenna element 1100 is disposed. Heat generated from the NAD 1400 may be transmitted to a region adjacent to the region where the antenna element 1100 is disposed. Accordingly, the heat dissipation area R2 where the heat sink 1060 may be disposed may be formed to be wider than the antenna region R1 where the antenna element 1100 may be disposed.

Figure 8:
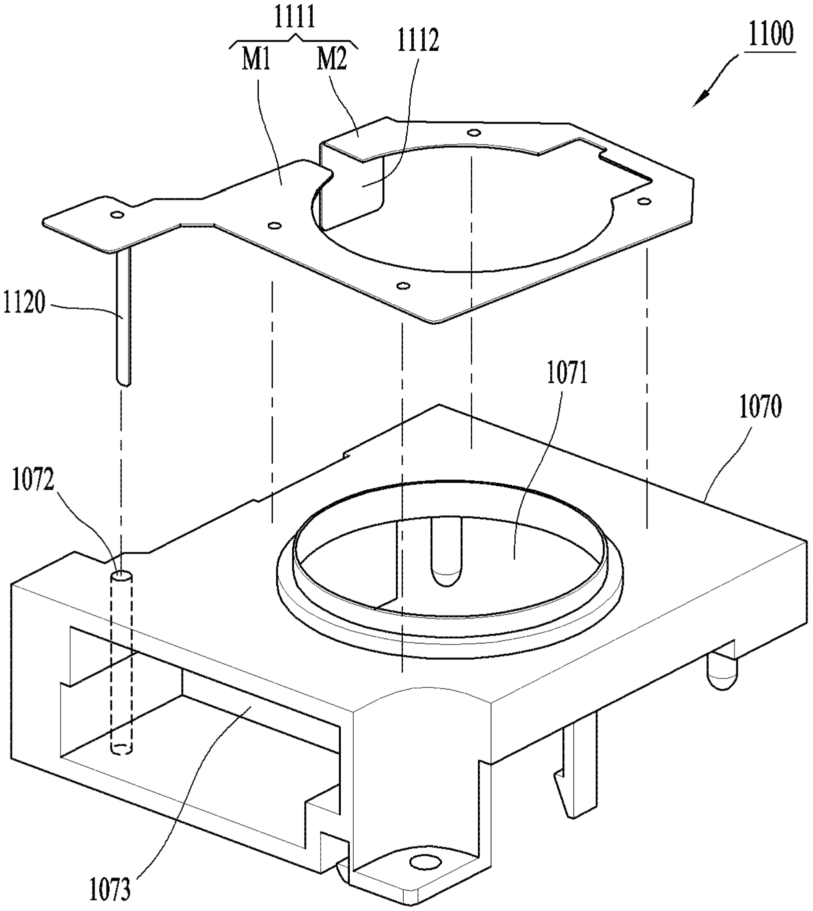
FIG. 8 illustrates a monopole loop-shaped antenna element according to an embodiment of the present disclosure.

Meanwhile, the antenna element according to the present disclosure may be formed in various shapes. In this regard, FIG. 7 illustrates a tapered monopole-shaped antenna element according to an embodiment of the present disclosure. Also, FIG. 8 illustrates a monopole loop-shaped antenna element according to an embodiment of the present disclosure.

Referring to FIG. 7, an antenna element 1100*a* may be referred to as a tapered monopole element. When the antenna element 1100*a* is mounted on a vehicle, a low elevation beam pattern may be formed based on a vertical direction, as illustrated in FIGS. 3A and 3B. The antenna element 1100*a* operates as a radiator that transmits and receives signals for 4G communication or 5G communication. Accordingly, the antenna element 1100*a* may be referred to as a 4G/5G low elevation antenna.

The antenna element 1100*a* may include an upper metal pattern 1111*a* and a side metal pattern 1112*a*. The antenna element 1100*a* may further include a feed pattern 1120*a*. The antenna element 1100*a* may further include a first shorting pattern 1131*a* and a second shorting pattern 1132*a*.

The upper metal pattern 1111*a* may be formed as a polygonal metal pattern. For example, the upper metal pattern 1111*a* may be formed as a square metal pattern with an aperture region AR1 formed therein. The upper metal pattern 1111*a* may have the aperture region AR1 formed therein. The side metal pattern 1112*a* may be perpendicularly connected to the upper metal pattern. The side metal pattern 1112*a* may be formed on a side surface of the dielectric carrier 1070 to have a tapered width.

Referring to FIGS. 5 and 7, the feed pattern 1120*a* may be disposed on an end portion of the side metal pattern 1112*a* to feed a signal from the PCB to the upper metal pattern 1111*a* through the side metal pattern.

The first shorting pattern 1131*a* may be formed perpendicular to the upper metal pattern 1111*a* at one point of a first pattern of the upper metal pattern 1111*a*. The first shorting pattern 1131*a* may be formed perpendicular to the upper metal pattern 1111*a* and coupled up to the ground.

The second shorting pattern 1131*b* may be formed perpendicular to the upper metal pattern 1111*a* at one point of a second pattern connected to the first pattern of the upper metal pattern 1111*a*. The second shorting pattern 1131*b* may be formed perpendicular to the upper metal pattern 1111*a* and coupled up to the ground.

The antenna element 1100*a* may be configured as a first antenna type, that is, a tapered monopole-shaped antenna that operates in 4G band and 5G band. In this regard, the side metal pattern 1112*a* configured as a tapered metal pattern is not limited to a circular shape. The side metal pattern 1112*a* may be implemented in an exponential, logarithm, elliptical, stepped, or linearly tapered shape.

As described above, FIG. 8 illustrates a monopole loop-shaped antenna element according to another embodiment of the present disclosure. On the other hand, FIG. 9 illustrates a structure in which the loop-shaped antenna element of FIG. 8 is disposed on a dielectric carrier coupled to a blower fan structure.

(a) of FIG. 9 is a perspective view illustrating that a loop-shaped antenna element 1100 is disposed on a top of a dielectric carrier 1070. (b) of FIG. 9 illustrates an antenna element 1100 disposed on the top of the dielectric carrier 1070 coupled to the blower fan structure 1060. Referring to (b) of FIG. 9, the side metal pattern 1112 of the antenna element 1100 may be disposed on a side surface of the dielectric carrier 1070. An aperture region 1073 may be formed in one side region of the dielectric carrier 1070 to dissipate heat.

(c) of FIG. 9 is a front view illustrating that the loop-shaped antenna element 1100 is disposed on the top of the dielectric carrier 1070. Referring to (c) of FIG. 9, the outer line of the antenna element 1100 may be formed along the outer line of the dielectric carrier 1070 on at least one side. (d) of FIG. 9 is a perspective view of the structure of (b) of FIG. 9, in which the loop-shaped antenna element 1100 is disposed on the dielectric carrier 1070, viewed from another side. Referring to (b) and (d) of FIG. 9, the antenna element 1100 that includes the upper metal pattern 1111 and the side metal pattern 1112 may be disposed on the top of the dielectric carrier 1070. The dielectric carrier 1070 may be configured to surround the top and bottom of the blower fan structure 1060 to support the blower fan structure 1060.

Referring to FIGS. 8 and 9, the antenna element 1100 may be referred to as a monopole element or a loop element. When implemented in a structure in which the side metal pattern 1112 of the antenna element 1100 is shorted to the ground, the antenna element 1100 may also be referred to as a planar inverted F antenna (PIFA). When the antenna element 1100 is mounted on a vehicle, Wi-Fi/V2X communication is enabled in addition to 4G/5G communication, so it may also be referred to as a 4G/5G/Wi-Fi/V2X antenna.

The antenna element 1100 may be configured to include an upper metal pattern 1111 and a feed pattern 1120. The antenna element 1100 may be configured to further include a side metal pattern 1112.

The upper metal pattern 1111 may be formed as a polygonal metal pattern. For example, the upper metal pattern 1111 may be formed as a square metal pattern with an aperture region AR2 formed therein. The upper metal pattern 1111 may have the aperture region AR2 formed therein.

Referring to FIGS. 5 to 9, the feed pattern 1120 may be formed perpendicular to the upper metal pattern 1111 at a first point of the upper metal pattern 1111. The feed pattern 1120 may be formed perpendicular to the upper metal pattern 1111 and may be configured to feed a signal from the PCB to the upper metal pattern.

The side metal pattern 1112 may be formed on the side surface of the dielectric carrier 1070 to be perpendicular to the upper metal pattern 1111 at a second point of the upper metal pattern 1111. The side metal pattern 1112 may be formed on the side surface of the dielectric carrier 1070 and spaced apart from the ground by a certain distance. As another example, the side metal pattern 1112 may be formed on the side surface of the dielectric carrier 1070 and connected to the ground to be shorted.

The upper metal pattern 1111 may include a first metal pattern M1 and a second metal pattern M2. The first metal pattern M1 may be connected to the feed pattern 1120. The second metal pattern M2 may be connected to the side metal pattern 1112, and one end portion thereof may be spaced apart from one end portion of the first metal pattern M1. Another end portion of the first metal pattern M1 may be closer to an end portion of the dielectric carrier 1070 than the one end portion of the first metal pattern M1.

The antenna element 1100 may be configured as a second antenna type, that is, a loop-shaped monopole antenna, operating in the 4G band, 5G band, Wi-Fi band, and V2X band. In this regard, the shape of the upper metal pattern 1111 is not limited to a rectangular shape. The upper metal pattern 1111 may be implemented in a circular or arbitrary polygonal shape. Additionally, the shape of the aperture region AR2 inside the upper metal pattern 1111 is not limited to a circular shape. The aperture region AR2 inside the upper metal pattern 1111 may be implemented in a square or arbitrary polygonal shape.

Meanwhile, the feed pattern 1120 may be configured to be accommodated inside the dielectric carrier 1070. The feed pattern 1120 may be accommodated in an inner space of a feed hole 1072 formed in the dielectric carrier 1070. The feed pattern 1120 may be connected to the metal pattern of the PCB and configured to transmit a signal from the metal pattern of the PCB to the upper metal pattern 1111 of the antenna element.

Referring to FIGS. 5 to 9, the antenna module 1000 may include a bottom cover 1300 and a top cover 1320*u*. The bottom cover 1300 may be disposed below the PCB 1200 and may be configured as a metal plate. The top cover 1300*u* may be configured to be coupled to the bottom cover 1300. The top cover 1300*u* may be coupled to the bottom cover 1300 to define an inner space therebetween, in which the heat sink 1050, the PCB 1200, the blower fan 1061, and the antenna element 1100 are accommodated. Accordingly, a signal radiated from the antenna element 1100 can be radiated to the top region of the antenna module 1000 through the top cover 1300*u*.

Meanwhile, a dielectric carrier on which an antenna element of an antenna module for a vehicle according to the present disclosure may be implemented as an air duct structure to improve heat dissipation performance. In this regard, FIG. 10 illustrates a configuration in which a dielectric carrier on which an antenna element is disposed and a heat sink are disposed on an antenna module for a vehicle according to the present disclosure.

Figure 10:
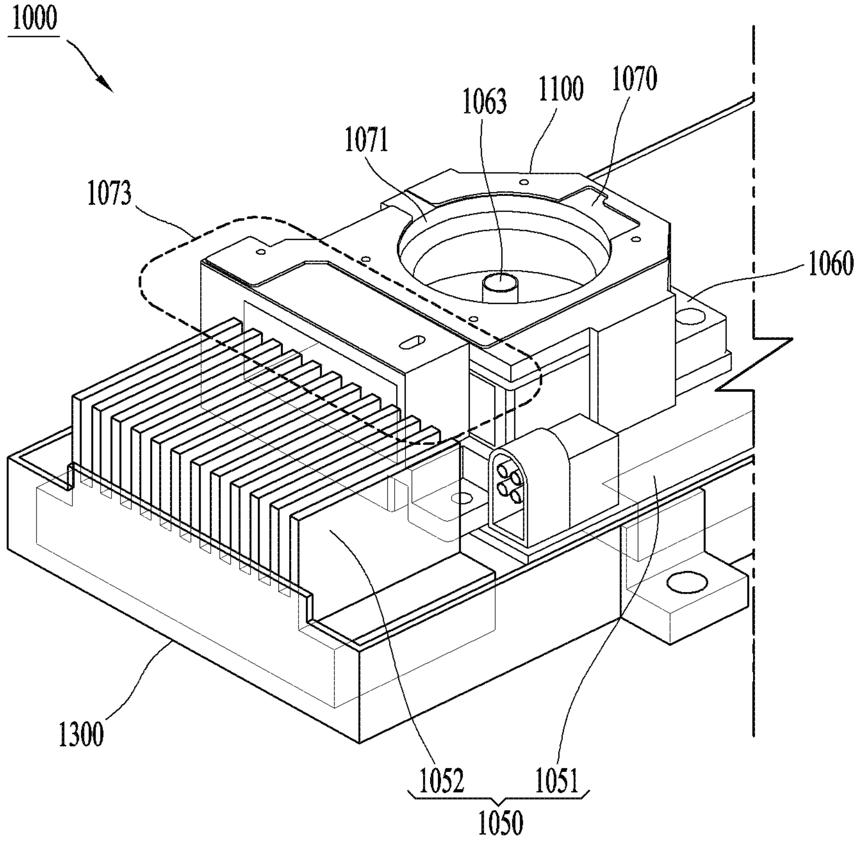
FIG. 10 illustrates a configuration in which a dielectric carrier on which an antenna element is disposed and a heat sink are disposed on an antenna module for a vehicle according to the present disclosure.

Referring to FIGS. 5 and 10, the dielectric carrier 1070 on which the antenna element 1100 of the antenna module 1000 is disposed may be implemented as an air duct structure to improve heat dissipation performance.

One side region of the dielectric carrier 1070 may have an air duct structure with an aperture region 1073, so that air generated by the blower fan 1061 is discharged through the side region of the top cover 1300*u*. In this regard, the aperture region 1073 of the dielectric carrier 1070 may be referred to as an air duct structure. Meanwhile, a wireless signal may be radiated from the antenna element 1100 through the top region of the top cover 1300*u*.

The dielectric carrier 1070 may be configured to be coupled with the blower fan structure 1060. The dielectric carrier 1070 may have a hole 1071 formed to correspond to the blower fan and have an aperture region 1073.

Meanwhile, the heat sink 1050 may include a plate 1051 and a rib structure 1052. The plate 1051 may be configured to be fastened to the bottom cover 1300 so that heat can be dissipated through the metal structure of the bottom cover 1300. The rib structure 1052 may be formed on a top region of the plate 1051 to be adjacent to the aperture region 1073 formed in one side region of the dielectric carrier 1070. Accordingly, air generated by the blower fan 1061 can be discharged through the side region of the top cover 1300*u* via the aperture region 1073 and the rib structure 1052.

Referring to FIG. 5, the antenna module 1000 may be configured to further include a network access device (NAD) 1450 and a thermoelectric cooler (TEC) 1500.

The NAD 1400 may be disposed on a rear region of the PCB 1200 and may be operably coupled to the antenna element 1100 to control a signal applied to the antenna element 1100. The TEC 1500 may be disposed between the NAD 1400 and the heat sink 1050. The TEC 1500 may be disposed between the NAD 1400 and the plate 1052 of the heat sink 1050.

Heat emitted from the NAD 1400 may be dissipated to the bottom region of the antenna module 1000 through the TEC 1500, the plate 1051 of the heat sink 1050, and the bottom cover 1300. The heat can thus be dissipated by air generated by the blower fan 1061 through the side region of the top cover 1300*u* via the aperture region 1073 and the rib structure 1052.

Meanwhile, in an antenna module for a vehicle according to the present disclosure, an antenna element may be provided in plurality disposed at different positions. In this regard, FIG. 11 illustrates an antenna module for a vehicle including a plurality of antenna elements disposed at different positions.

Figure 11:
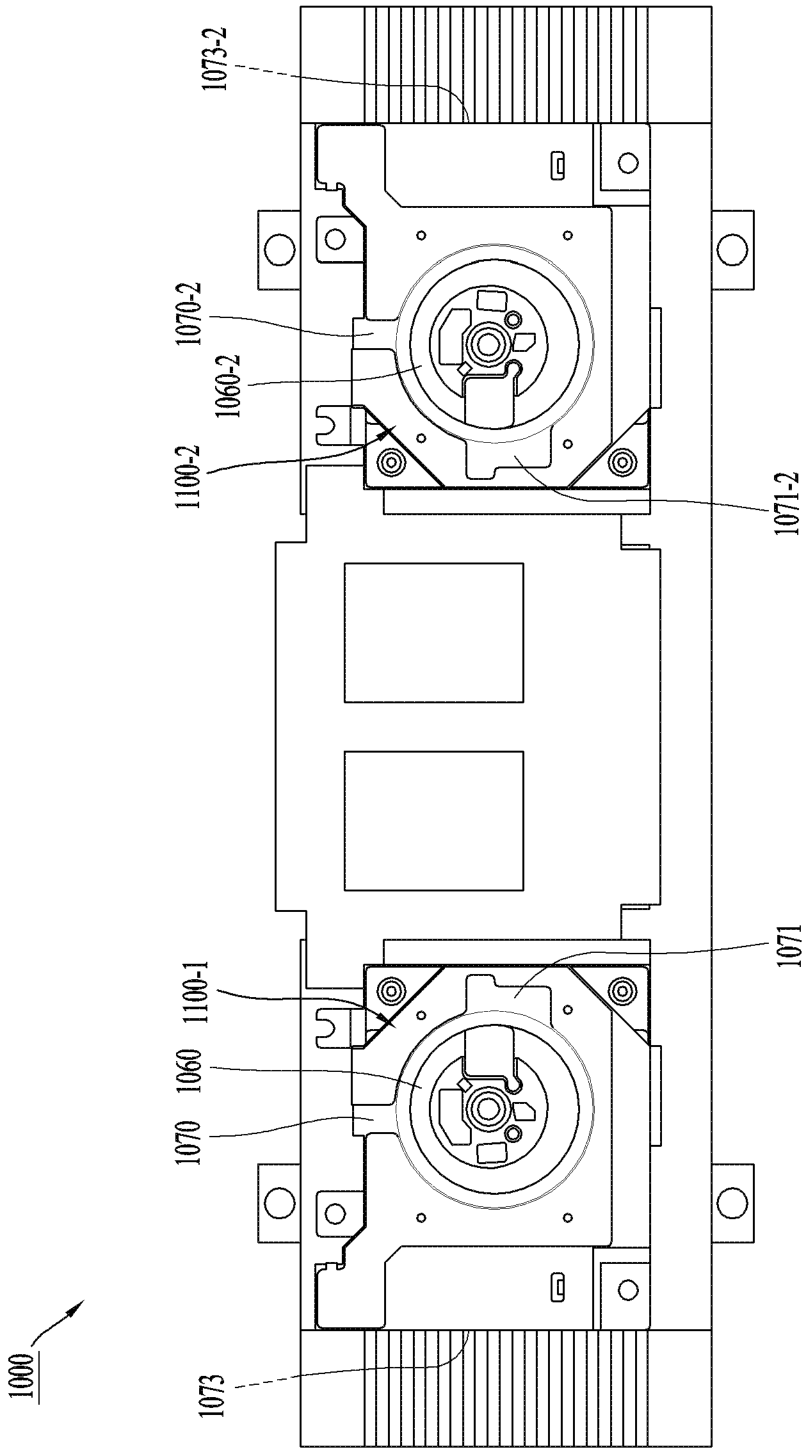
FIG. 11 illustrates an antenna module for a vehicle including a plurality of antenna elements disposed at different positions.

Referring to FIGS. 5 and 11, the antenna element may include a first antenna 1100-1 and a second antenna 1100-2. In this regard, the first antenna 1100-1 and the second antenna 1100-2 may be implemented as a second antenna type, namely, a loop-shaped monopole element, as illustrated in FIG. 8, but are not limited thereto. As another example, at least one of the first antenna 1100-1 and the second antenna 1100-2 may be implemented as a first antenna type, namely, a tapered monopole element, as illustrated in FIG. 7.

The first antenna 1100-1 may be disposed on a dielectric carrier 1070 located on one side region of the PCB 1200. The second antenna 1100-2 may be disposed on a second dielectric carrier 1070-2 located on another side region of the PCB 1200.

A blower fan structure 1060 may be disposed on one side of the antenna module. Additionally, the second blower fan structure 1060-2 may be disposed on another side of the antenna module. Therefore, communication reliability can be improved by increasing the number of antenna elements 1100-1 and 1100-2 within the antenna module while improving heat dissipation performance by the blower fan structure 1060 and the second blower fan structure 1060-2. Communication reliability can be improved by performing a diversity operation through the first antenna 1100-1 and the second antenna 1100-2. Furthermore, communication capacity can be improved by performing a MIMO operation through the first antenna 1100-1 and the second antenna 1100-2.

The dielectric carrier 1070 may be provided with a hole 1071 formed to correspond to the blower fan of the blower fan structure 1060. The dielectric carrier 1070 may have an aperture region 1073 of an air duct structure to dissipate heat emitted from the NAD 1400 through a side surface. Additionally, the second dielectric carrier 1070-2 may also be provided with a hole 1071-2 formed to correspond to a blower fan of the second blower fan structure 1060-2. The second dielectric carrier 1070-2 may have an aperture region 1073-2 of an air duct structure to dissipate heat emitted from the NAD 1400 through a side surface.

The NAD 1400 may determine whether a signal received through the first antenna 1100-1 has quality below a threshold. When the quality of the signal received through the first antenna 1100-1 is below the threshold, the NAD 1400 may apply a signal to any one of the first antenna 1100-1 and the second antenna 1100-2 to receive the signal through the second antenna 1100-2.

The NAD 1400 may perform a MIMO or diversity operation in a first band through the first antenna 1100-1 and the second antenna 1100-2. The NAD 1400 may be configured to perform a MIMO or diversity operation in a second band different from the first band when a first signal quality of the first band is below a threshold. In this regard, the NAD 1400 may perform the MIMO or diversity operation in the second band through the first antenna 1100-1 and the second antenna 1100-2.

For example, the first band may be set to a low band among 4G/5G communication bands, and the second band may be any frequency band higher than the first band among the 4G/5G communication bands, but are not limited thereto. The first band may be set to a low band among 4G/5G/WiFi/V2X communication bands, and the second band may be any frequency band higher than the first band among the 4G/5G/WiFi/V2X communication bands, but are not limited thereto.

Figure 12:
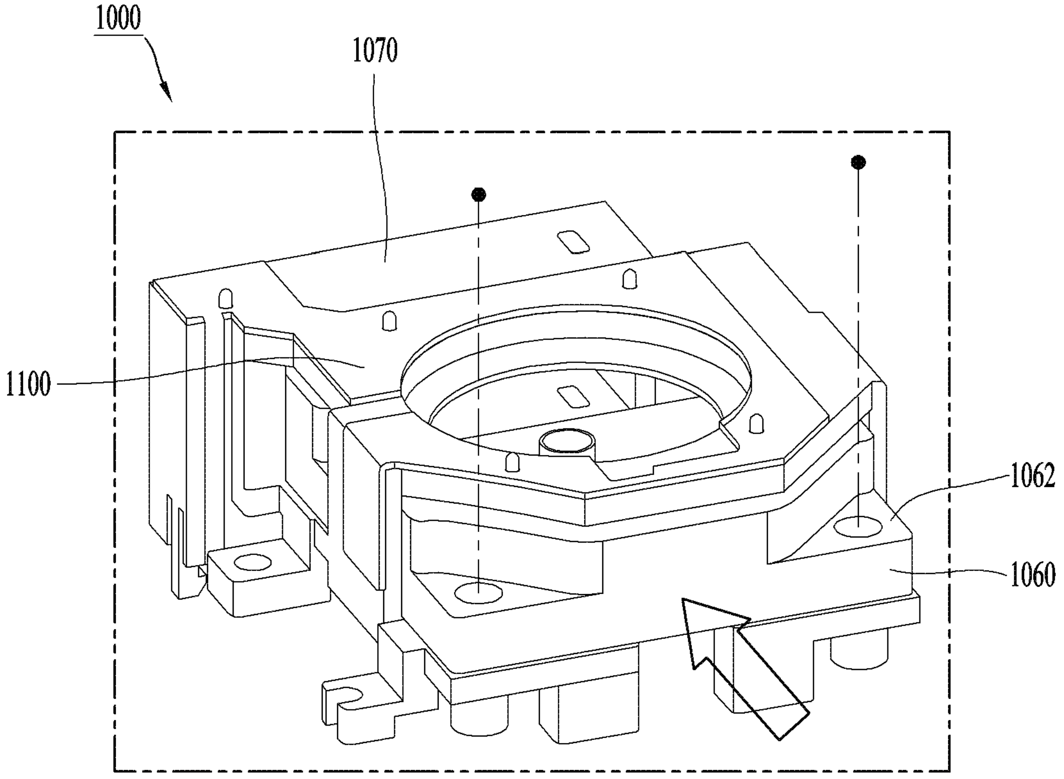
FIG. 12 illustrates a structure in which an antenna element is coupled to a dielectric carrier, into which a blower fan structure may be inserted, in an antenna module for a vehicle according to the present disclosure.

Meanwhile, in an antenna module for a vehicle according to the present disclosure, an antenna element may be coupled to a dielectric carrier, into which a blower fan structure may be inserted. Additionally, the dielectric carrier may be coupled to the PCB through a fastening structure. In this regard, FIG. 12 illustrates a structure in which an antenna element is coupled to a dielectric carrier, into which a blower fan structure may be inserted, in an antenna module for a vehicle according to the present disclosure. On the other hand, FIG. 13 illustrates a structure in which the dielectric carrier and a PCB are coupled to each other in the antenna module of FIG. 12.

Referring to FIG. 12, the blower fan structure 1060 may be inserted into the inner region of the dielectric carrier 1070 in a sliding structure. Accordingly, when the hole 1062 of the blower fan structure 1060 is aligned with the hole of the dielectric carrier 1070, the blower fan structure 1060 and the dielectric carrier 1070 can be fastened to each other through a screw. The blower fan structure 1060 and the dielectric carrier 1070 may be coupled to each other at at least two points. Meanwhile, in a state where the dielectric carrier 1070 has been coupled to the PCB of the antenna module, the blower fan structure 1060 may be installed to be inserted into an empty space of the dielectric carrier 1070.

Figure 13:
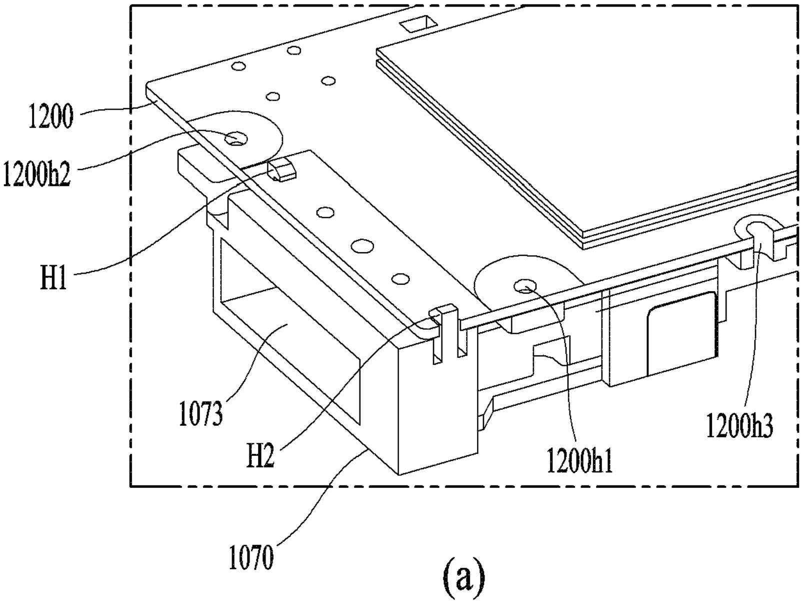
FIG. 13 illustrates a structure in which a dielectric carrier and a PCB are coupled to each other in the antenna module of FIG. 12.
Figure 13:
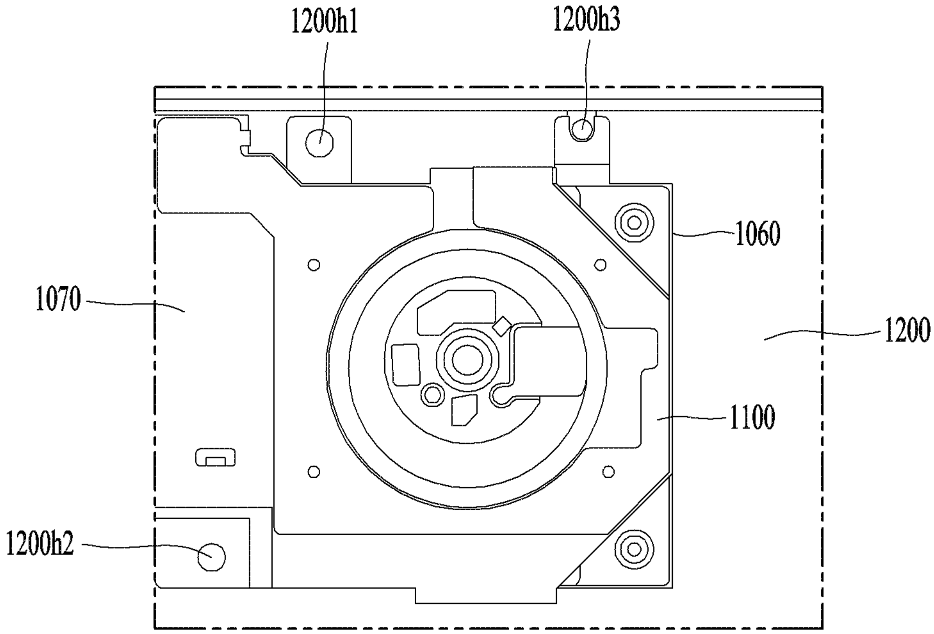

(a) of FIG. 13 illustrates the rear surface of the PCB 1200 fastened to the dielectric carrier 1070. (b) of FIG. 13 illustrates the front surface of the PCB 1200 fastened to the dielectric carrier 1070.

Referring to (a) of FIG. 13, the rear surface of the PCB 1200 may be coupled to the rear surface of the air duct structure 1073 of the dielectric carrier 1070 by hook structures H1 and H2. Holes 1200*h*1, 1200*h*2, and 1200*h*3 formed in the PCB 1200 may be coupled to the holes formed in the blower fan structure 1060 and/or the dielectric carrier 1070 by screw structures. In this regard, the number of holes formed in the PCB 1200 is not limited to the configuration illustrated in (a) of FIG. 13. The number of holes formed in the PCB 1200 may vary depending on an application in consideration of the shape and mechanical structure of the blower fan structure 1060 and/or the dielectric carrier 1070.

Referring to the front surface structure of the PCB 1200 in (b) of FIG. 13, the holes 1200*h*1, 1200*h*2, and 1200*h*3 formed in the PCB 1200 may be coupled to the holes formed in the blower fan structure 1060 and/or the dielectric carrier 1070 by screw structures. In this regard, the number of holes formed in the PCB 1200 is not limited to the configuration illustrated in (a) of FIG. 13. The number of holes formed in the PCB 1200 may vary depending on an application in consideration of the shape and mechanical structure of the blower fan structure 1060 and/or the dielectric carrier 1070.

As an example, when the antenna module is mounted on the roof of a vehicle, the holes 1200*h*1 and 1200*h*2 formed in the top and bottom regions of one side of the PCB 1200 may be coupled the holes formed in the blower fan structure 1060 and/or the dielectric carrier 1070 by screw structures. Accordingly, the screw structures passing through the holes 1200*h*1 and 1200*h*2 formed through the top and bottom regions of the one side of the PCB 1200 can be coupled to the roof structure of the vehicle through the blower fan structure 1060 and/or the dielectric carrier 1070.

Meanwhile, referring to FIGS. 6A and 13, some of the front region and side regions of the blower fan structure 1060 may be configured as a dielectric structure so that a radio signal is radiated from the antenna element 1100. The motor driving part 1063 that is made of a metal and formed at the center of the blower fan structure 1060 may be formed in a cylindrical structure with a predetermined diameter or less so as not to interfere with the radio signal from the antenna element 1100. In this regard, the front region and side regions of the blower fan structure 1060 may be configured as a mold structure made of a dielectric material. Accordingly, the front region and side regions of the blower fan structure 1060 may be formed of a dielectric material so as not to interfere with the radio signal radiated from the antenna element 1100. The front region and side regions of the blower fan structure 1060 may be regions corresponding to an area where the antenna element 1100 is disposed.

Figure 14:
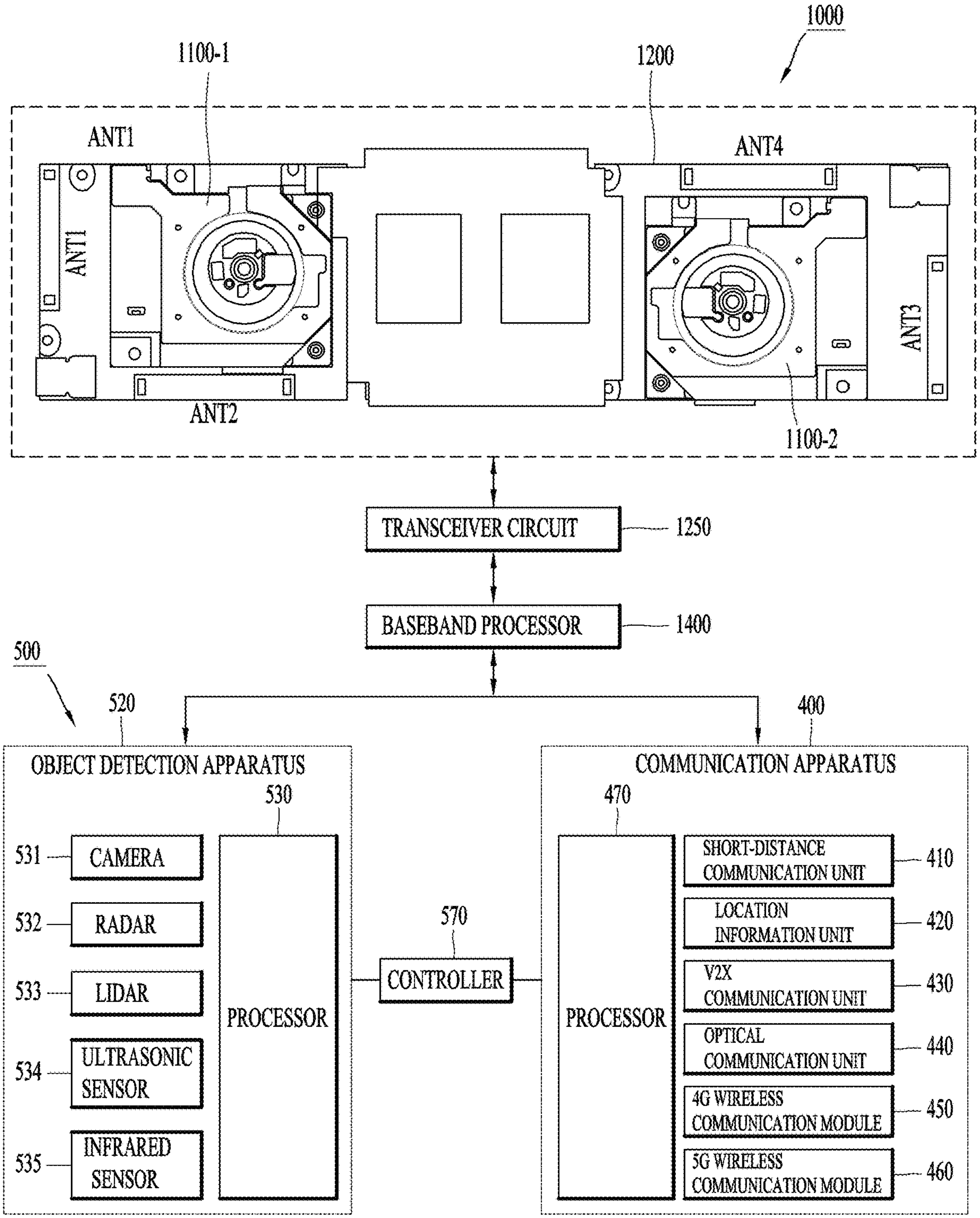
FIG. 14 is a block diagram illustrating an antenna module and a vehicle on which the antenna module is mounted according to the present disclosure.

Meanwhile, FIG. 14 is a block diagram illustrating an antenna module and a vehicle on which the antenna module is mounted according to the present disclosure. Specifically, FIG. 14 is a block diagram of a vehicle illustrating that an antenna module corresponding to an antenna system is mounted inside a roof of the vehicle to perform communications with adjacent electronic devices, vehicles, infrastructures.

Referring to FIG. 14, the wideband antenna module 1000 may be mounted on the vehicle. The antenna module 1000 may perform short-range communication, wireless communication, V2X communication, and the like by itself or through the communication apparatus 400. To this end, the baseband processor 1400 may perform control such that a signal is received from or transmitted to the adjacent vehicle, the RSU, and the base station through the antenna module 1000.

Alternatively, the baseband processor 1400 may perform control such that a signal is received from or transmitted to the adjacent vehicle, the RSU, the adjacent object, and the base station through the communication apparatus 400. Here, the information related to adjacent objects may be acquired through the object detecting apparatus such as the camera 531, the radar 532, the lidar 533, and the sensors 534 and 535 of the vehicle 300. Alternatively, the baseband processor 1400 may control the communication device 400 and the antenna module 1000 such that a signal is received from or transmitted to the adjacent vehicle, the RSU, the adjacent object, and the base station.

Meanwhile, referring to FIGS. 1A to 14, the vehicle 500 having the antenna module 1000 may include the plurality of antennas 1100, the transceiver circuitry 1250, and the baseband processor 1400. The vehicle 500 may further include the object detecting apparatus 520. The vehicle 500 may further include the communication apparatus 400. Here, the communication apparatus 400 may be configured to perform wireless communication through the antenna unit.

Referring to FIGS. 1A to 14, the vehicle 500 may include the antenna module 1000. The antenna module 1000 may be disposed on the bottom of the roof of the vehicle, and perform communication with at least one of an adjacent vehicle, a Road Side Unit (RSU), and a base station through the processor. Since the antenna module 1000 performs telematics operations through wireless communication in the vehicle, it may also be referred to as a telematics module. In this regard, the second PCB 1200 in the antenna module 1000 may be coupled with the telematics module 1200*c* that performs a telematics function. In this regard, the second PCB 1200 and the telematics module 1200*c* may be combined to interface with each other on the same plane.

Hereinafter, a vehicle 500 having an antenna module 1000 according to another aspect of the present disclosure will be described, with reference to FIGS. 1A to 14. The vehicle 500 may include an antenna module 1000 disposed below the roof of the vehicle. The vehicle 500 may further include a processor 1400 disposed inside or outside the antenna module 1000 and configured to communicate with at least one of an adjacent vehicle, a road side unit (RSU), and a base station.

The antenna module 1000 mounted on a vehicle may include a PCB 1200 on which electronic components are disposed. The antenna module 1000 may include a heat sink 1050 that is disposed below the PCB 1200 and is formed of a metal structure to absorb heat generated from at least one of the electronic components. The antenna module 1000 may include a blower fan structure 1060 that is disposed above the PCB 1200, and provided with a blower fan 1061 therein, which is configured to dissipate the heat generated from the at least one of the electronic components.

The antenna module 1000 may include a dielectric carrier 1070 that is coupled to the blower fan structure 1060 and has a hole formed to correspond to the blower fan 1061. The antenna module 1000 may include an antenna element 1100 that is configured as a metal pattern on the top of the dielectric carrier 1070 to radiate a radio signal to the top region.

The antenna element 1100 may be formed in a 4G/5G/WiFi/V2X antenna structure. The antenna element 1100 may include an upper metal pattern 1111 that is formed as a polygonal metal pattern, and has an aperture region AR1 formed to correspond to the hole of the dielectric carrier. The antenna element 1100 may include a feed pattern 1120 that is formed perpendicular to the upper metal pattern 1111 at a first point of the upper metal pattern 1111 to feed a signal from the PCB 1200 to the upper metal pattern 1111. The antenna element 1100 may include a side metal pattern 1112 that is formed on a side surface of the dielectric carrier 1070 to be perpendicular to the upper metal pattern 1111 at a second point of the upper metal pattern 1111. The side metal pattern 1112 may be spaced apart from the ground by a certain distance or may be connected to the ground to be shorted.

The antenna module 1000 may include a bottom cover 1300 that is disposed below the PCB 1200 and is made of a metal plate. The antenna module 1000 may include a top cover 1300*u* that is fastened to the bottom cover 1300 to accommodate the heat sink 1050, the PCB 1200, the blower fan 1061, and the antenna element 1100 therein.

The heat sink 1050 may include a plate 1051 configured to be coupled to the bottom cover 1300. The heat sink 1050 may include a rib structure 1052 that is formed on a top region of the plate 1051 to be adjacent to the aperture region 1073 formed in one side region of the dielectric carrier 1070. Air generated by the blower fan 1061 can be discharged through the side region of the top cover 1300*u* via the aperture region 1073 and the rib structure 1052. A radio signal may be radiated from the antenna element 1100 through the top region of the top cover 1300*u*.

The antenna module 1000 may include a NAD 1400 that is disposed on a rear region of the PCB 1200 and may be operably coupled to the antenna element 1100 to control a signal applied to the antenna element 1100. In this regard, the antenna module 1000 may further include a thermoelectric cooler (TEC) 1500 disposed between the NAD 1400 and the heat sink 1050. The NAD 1400 may be configured to perform operations performed by the processor 1450. The NAD 1400 and the processor 1450 may be implemented as an integrated processor. Accordingly, the terms of the NAD 1400 and the processor 1450 may be used interchangeably.

Heat emitted from the NAD 1400 may be dissipated to the bottom region of the antenna module 1000 through the TEC 1500, the plate 1051 of the heat sink 1050, and the bottom cover 1300. Air generated by the blower fan 1061 can be discharged through the side region of the top cover 1300*u* via the aperture region 1073 and the rib structure 1052.

The antenna element 1000 may include a first antenna 1100-1 that is formed on the dielectric carrier 1070 disposed on one side region of the PCB 1200. The antenna element 1000 may further include a second antenna 1100-2 that is formed on a second dielectric carrier 1070-2 disposed on another side region of the PCB 1200.

When quality of a signal received through the first antenna 1100-1 is below a threshold, the NAD 1400 may apply a signal to any one of the first antenna 1100-1 and the second antenna 1100-2 to receive the signal through the second antenna 1100-2. The NAD 1400 may perform a MIMO or diversity operation in a first band through the first antenna 1100-1 and the second antenna 1100-2. When a first signal quality of the first band is below the threshold, the NAD 1400 may perform the MIMO or diversity operation in a second band different from the first band through the first antenna 1100-1 and the second antenna 1100-2.

In relation to the MIMO or diversity operation, the first antenna 1100-1 and the second antenna 1100-2 may be configured to transmit or receive signals of the same band. Accordingly, signals can be simultaneously transmitted or received through the first antenna 1100-1 and the second antenna 1100-2, thereby increasing communication capacity or improving communication reliability.

The transceiver circuitry 1250 may be operably coupled to the first antenna element 1110-1 and the second antenna element 1110-2. The processor 1400 may be operably coupled to the transceiver circuitry 1250. The processor 1400 may be a baseband processor corresponding to a modem, but is not limited thereto and may be any processor that controls the transceiver circuitry 1250. The processor 1400 of the vehicle may be implemented as a network access device (NAD).

Meanwhile, the transceiver circuitry 1250 and/or the processor 1400 may be disposed in the antenna module 1000. As an example, the transceiver circuitry 1250 and/or the processor 1400 may be disposed on the PCB 1200 of the antenna module 1000. As an example, the transceiver circuitry 1250 and/or the processor 1400 may be disposed in a telematics module, separate from the antenna module 1100.

The telematics module may be implemented on a separate substrate from the PCB 1200 of the antenna module 1000, or may be implemented on a separate substrate or the same substrate on the same plane.

The transceiver circuitry 1250 may be operably coupled to the MIMO antennas ANT1 to ANT4. The transceiver circuitry 1250 may include a front end module (FEM) such as a power amplifier or a receiving amplifier. As another example, the front end module (FEM) may be disposed between the transceiver circuitry 1250 and the antenna, separately from the transceiver circuitry 1250. The transceiver circuitry 1250 may control the amplitude and/or phase of signals transmitted to the MIMO antennas ANT1 to ANT4 or control only some antenna modules to operate by adjusting the gain or input or output power of the power amplifier or the receiving amplifier.

The processor 1400 may be operably coupled to the transceiver circuitry 1250 and may be configured to control the transceiver circuitry 1250. The processor 1400 may control the transceiver circuitry 1250 to control the amplitude and/or phase of the signals transmitted to the MIMO antennas ANT1 to ANT4 or to operate only some antenna modules. The processor 1400 may perform communication with at least one of the adjacent vehicle, the RSU, and the base station through the transceiver circuitry 1250.

A vehicle having an antenna module according to the present disclosure may simultaneously receive the same information from various entities, so as to improve reliability of surrounding information and decrease latency. Accordingly, Ultra Reliable Low Latency Communication (URLLC) can be performed in the vehicle and the vehicle can operate as a URLLC UE. To this end, a base station that performs scheduling may preferentially allocate a time slot for the vehicle operating as the URLLC UE. For this, some of specific time-frequency resources already allocated to other UEs may be punctured.

As described above, the plurality of antennas ANT1 to ANT4 for 4G/5G communication within the antenna module 1000 may operate in the full band including the low band (LB), the mid band (MB), and the high band (HB). Here, the low band (LB) may be referred to as the first (frequency) band and the mid band (MB) and the high band (HB) may be referred to as the second (frequency) band. As another example, when the antenna system 1000 operates in the mid band (MB) and the high band (HB), the middle band (MB) is referred to as a first (frequency) band and the high band (HB) is referred to as a second (frequency) band. The 5G SUB6 band may be the same band as the LTE band in case of LTE re-farming. When 5G NR operates in a band separate from LTE, it may operate in the high band (HB) or a higher band. The 5G SUB6 band operating in the high band (HB) or higher band may also be referred to as a second (frequency) band.

The baseband processor 1400 can perform MIMO through some of the plurality of antenna elements ANT1 to ANT4 in the first frequency band. Also, the baseband processor 1400 can perform MIMO through some of the plurality of antenna elements ANT1 to ANT4 in the second frequency band. In this regard, the baseband processor 1400 can perform MIMO by using antenna elements that are sufficiently spaced apart from each other and disposed by being rotated at a predetermined angle. This can improve isolation between the first and second signals within the same band.

The baseband processor 1400 may control the transceiver circuitry 1250 to receive the second signal of the second frequency band while receiving the first signal of the first frequency band through one of the first to fourth antennas ANT1 to ANT4. In this case, there may be provided an advantage that the baseband processor 1400 can advantageously perform carrier aggregation (CA) through one antenna.

Alternatively, the baseband processor 1400 may control the transceiver circuitry 1250 to receive the first signal of the second band through any one of the second antenna ANT2 and the fourth antenna ANT4 while receiving the first signal of the second band through any one of the first antenna ANT1 and the third antenna ANT3. In this case, there may be provided an advantage that each antenna can be designed to optimally operate in a corresponding band.

Therefore, the baseband processor 1400 can perform carrier aggregation (CA) through a combination of the first frequency band and the second frequency band. When it is necessary to receive a large amount of data for autonomous driving or the like, reception in a broad band can be allowed through the CA.

Accordingly, eMBB (Enhanced Mobile Broad Band) communication can be performed in the vehicle and the vehicle can operate as an eMBB UE. To this end, the base station that performs scheduling may allocate a broadband frequency resource to the vehicle that operates as the eMBB UE. To this end, the CA may be performed on frequency bands that are available, except for frequency resources already allocated to other UEs.

Regard the frequency band, the low band (LB), the mid band (MB), and the high band (HB) may be referred to as the first band, the second band, and the third band, respectively. The antenna system 1000 may operate as a single antenna in the first band, the second band, and the third band corresponding to the low band (LB), the middle band (MB), and the high band (HB). In this regard, the processor 1400 may determine a resource region allocated through a physical downlink control channel (PDCCH). The processor 1400 may control the transceiver circuitry 1250 to perform carrier aggregation in two or more of the first to third bands based on the allocated resource region.

The processor 1400 may perform MIMO in an EN-DC state through the first to fourth antennas ANT1 to ANT4. For example, the processor 1400 may perform an EN-DC operation through the first antenna ANT1 and the second antenna ANT2, and MIMO through the third antenna ANT3 and the fourth antenna ANT4.

In this regard, when the EN-DC operation is performed between a 4G/5G communication system and a WiFi communication system using different bands, the processor 1400 may perform the EN-DC operation through a plurality of antennas in one antenna system. Accordingly, an interference level between MIMO streams using the same band can be reduced. On the other hand, when the EN-DC operation is performed between the 4G and 5G communication systems using the same band, the processor 1400 may perform the EN-DC operation through a plurality of antennas in different antenna systems. In this case, in order to reduce the interference level in the low band (LB), the MIMO operation through the plurality of antennas in the same antenna system may be performed in the mid band (MB) or higher.

It will be clearly understood by those skilled in the art that various modifications and alternations for the aforementioned implementations related to the antenna system having the plurality of antennas, the vehicle having the antenna system, and the control operations thereof are made without departing from the idea and scope of the present disclosure. Therefore, it should be understood that such various modifications and alternations for the implementations fall within the scope of the appended claims.

In the above, an antenna module having a wideband antenna mounted on a vehicle and a vehicle including the antenna module have been described. The technical effects of such antenna module having the wideband antenna mounted on the vehicle and the vehicle equipped with the antenna module will be described as follows.

The technical effects of such antenna module having the wideband antenna mounted on the vehicle and the vehicle equipped with the antenna module will be described as follows.

The present disclosure can provide an antenna structure with improved heat dissipation performance by disposing an antenna element such that a blower fan region and an antenna region overlap each other.

The present disclosure may propose an antenna module for a vehicle for optimizing both antenna performance and heat dissipation performance by disposing an antenna element above a blower fan structure.

According to the present disclosure, an antenna element can be designed in various shapes on a dielectric carrier on a top of a blower fan structure. Accordingly, an antenna structure operating to cover a full band of 4G/5G low bands (LB) while optimizing heat dissipation performance can be provided.

According to the present disclosure, an antenna element can be designed in various shapes on a dielectric carrier on a top of a blower fan structure. This can result in covering an entire 4G/5G low band (LB) and Wi-Fi and V2X communication bands while optimizing heat dissipation performance.

According to the present disclosure, a plurality of antenna elements may be disposed on top of a plurality of heat dissipation fan structures. Accordingly, diversity or MIMO can be performed through the plurality of antenna elements while maintaining heat dissipation performance.

According to the present disclosure, a plurality of antenna elements may be disposed on one side region and another side region of a PCB, but may be disposed above a plurality of heat dissipation fan structures. This can result in providing a configuration capable of maintaining isolation below a certain level while improving antenna performance of the plurality of antenna elements.

According to the present disclosure, a bottom cover of an antenna module may be made of a metallic material and a top cover may be made of a non-metallic material. A heat sink, a dielectric carrier, and an antenna element may be disposed in a space defined between the bottom cover and the top cover. This can result in providing an antenna structure for providing a radio signal to an inner region of a vehicle even in case where the exterior of a vehicle body or roof is made of a metal material.

According to the present disclosure, a heat sink, a dielectric carrier, and an antenna element can be disposed in a space between a bottom cover and a top cover of an antenna module. Antenna performance and heat dissipation performance can be improved while maintaining an overall height of the antenna module below a certain level.

According to the present disclosure, a heat sink, a dielectric carrier, and an antenna element can be disposed in a space between a bottom cover and a top cover of an antenna module. Meanwhile, other antenna elements may be further disposed on a PCB where the dielectric carrier and antenna elements are disposed. Accordingly, a structure for improving heat dissipation performance and antenna performance while mounting on a vehicle an antenna system, which is capable of operating in a broad frequency band to support various communication systems, can be provided.

Further scope of applicability of the present disclosure will become apparent from the foregoing detailed description. It should be understood, however, that the detailed description and specific examples, such as the preferred embodiment of the present disclosure, are given by way of illustration only, since various modifications and alternations within the spirit and scope of the disclosure will be apparent to those skilled in the art.

Meanwhile, the antenna module 1000 with improved heat dissipation performance and antenna performance according to the present disclosure may be configured to perform a diversity or MIMO operation. In this regard, there is a need to simultaneously receive or transmit information from or to various entities such as adjacent vehicles, RSUs, base stations, etc. for autonomous driving. Accordingly, the vehicle can improve its communication capacity by receiving different information from various entities at the same time. Therefore, the communication capacity can be improved through the MIMO operation in the vehicle even without expansion of a bandwidth or communication reliability can be improved through the diversity operation.

An antenna module mounted on a vehicle and an operation of controlling the same may be implemented by software, firmware, or a combination thereof. Meanwhile, the design of the antenna system mounted in the vehicle and the configuration of controlling the antenna system can be implemented as computer-readable codes in a program-recorded medium. The computer-readable medium may include all types of recording devices each storing data readable by a computer system. Examples of such computer-readable media may include hard disk drive (HDD), solid status disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may also include a controller of a terminal or vehicle, namely, a processor. Therefore, the detailed description should not be limitedly construed in all of the aspects, and should be understood to be illustrative. The scope of the invention should be determined by reasonable interpretation of the appended claims and all changes that come within the equivalent scope of the invention are included in the scope of the invention.

The invention claimed is:

1. An antenna module for a vehicle, the antenna module comprising:

a printed circuit board (PCB) including electronic components;

a metal heat sink disposed below the PCB to absorb heat generated from at least one of the electronic components;

a blower fan structure disposed above the PCB and having a blower fan to dissipate heat generated from the at least one of the electronic components;

a dielectric carrier coupled to the blower fan structure and having a hole formed to correspond to an area occupied by the blower fan; and an antenna element formed as a metal pattern on a top of the dielectric carrier to radiate a radio signal.

2. The antenna module of claim 1, wherein the antenna element comprises:

an upper metal pattern formed as a polygonal metal pattern and having an aperture region inside the metal pattern;

a side metal pattern connected perpendicularly to the upper metal pattern and formed on a side surface of the dielectric carrier and having a tapered width; and a feed pattern formed on an end portion of the side metal pattern to feed a signal from the PCB to the upper metal pattern through the side metal pattern.

3. The antenna module of claim 2, wherein the antenna element further comprises:

a first shorting pattern formed perpendicular to the upper metal pattern at one point of a first pattern of the upper metal pattern and configured to be coupled up to a ground; and a second shorting pattern formed perpendicular to the upper metal pattern at one point of a second pattern connected to the first pattern of the upper metal pattern and configured to be coupled up to the ground, and wherein the antenna element is a first antenna type operating in a 4G band and a 5G band.

4. The antenna module of claim 1, wherein the antenna element comprises:

an upper metal pattern formed as a polygonal metal pattern and having an aperture region formed inside the metal pattern to correspond to the hole of the dielectric carrier; and a feed pattern formed perpendicular to the upper metal pattern at a first point of the upper metal pattern and configured to feed a signal from the PCB to the upper metal pattern.

5. The antenna module of claim 4, wherein the antenna element further comprises a side metal pattern formed on a side surface of the dielectric carrier to be perpendicular to the upper metal pattern at a second point of the upper metal pattern, and spaced apart from a ground by a certain distance.

6. The antenna module of claim 5, wherein the upper metal pattern comprises:

a first metal pattern connected to the feed pattern; and a second metal pattern connected to the side metal pattern and having one end portion spaced apart from one end portion of the first metal pattern, wherein another end portion of the first metal pattern is located closer to an end portion of the dielectric carrier than the one end portion of the first metal pattern, and wherein the antenna element is a second antenna type that operates in 4G band, 5G band, Wi-Fi band, and V2X band.

7. The antenna module of claim 4, wherein the feed pattern is accommodated in an inner space of a feed hole formed in the dielectric carrier to be connected to a metal pattern of the PCB, so that a signal is transmitted from the metal pattern of the PCB to the upper metal pattern of the antenna element.

8. The antenna module of claim 1, further comprising:

a bottom cover disposed below the PCB and configured as a metal plate; and a top cover fastened to the bottom cover and configured to accommodate the heat sink, the PCB, the blower fan, and the antenna element therein, wherein the radio signal is radiated from the antenna element to a top region of the antenna module through the top cover.

9. The antenna module of claim 8, further comprising:

an air duct structure including an aperture region in one side region of the dielectric carrier such that air generated by the blower fan is discharged through the side region of the top cover, wherein the radio signal is radiated from the antenna element through a top region of the top cover.

10. The antenna module of claim 9, wherein the heat sink comprises:

a plate configured to be fastened to the bottom cover; and a rib structure formed on a top region of the plate to be adjacent to the aperture region of the one side region of the dielectric carrier, and wherein air generated by the blower fan is discharged through a side region of the top cover via the aperture region and the rib structure.

11. The antenna module of claim 10, further comprising:

a network access device (NAD) disposed on a rear region of the PCB and operably coupled to the antenna element to control a signal applied to the antenna element; and a thermoelectric cooler (TEC) disposed between the NAD and the heat sink, wherein heat emitted from the NAD is dissipated to a bottom region of the antenna module through the thermoelectric cooler, a plate of the heat sink, and the bottom cover, and wherein dissipated by air generated by the blower fan through a side region of the top cover via the aperture region and the rib structure.

12. The antenna module of claim 11, wherein the antenna element is a first antenna formed on the dielectric carrier disposed on one side region of the PCB, wherein the antenna element further comprises a second antenna formed on a second dielectric carrier disposed on another side region of the PCB, and wherein the NAD applies a signal to one of the first antenna and the second antenna to receive a signal through the second antenna when quality of a signal received through the first antenna is below a threshold.

13. The antenna module of claim 12, wherein the NAD performs a multi-input/multi-output (MIMO) or diversity operation through the first antenna and the second antenna in a first band, and performs the MIMO or diversity operation through the first antenna and the second antenna in a second band different from the first band when first signal quality of the first band is below the threshold.

14. The antenna module of claim 1, wherein a rear surface of the PCB is coupled to a rear surface of an air duct structure of the dielectric carrier by hook structures, and wherein holes formed in the PCB are coupled to holes formed in the dielectric carrier by screw structures.

15. The antenna module of claim 1, wherein a portion of the front and side regions of the blower fan structure are formed as a dielectric structure to radiate radio signals from the antenna element, and wherein a metal motor driving part is disposed at a center of the blower fan structure and has a cylindrical structure with a diameter not interfering with the radio signal from the antenna element.

16. A vehicle having an antenna module mounted thereon, the vehicle comprising:

an antenna module disposed on a bottom of a roof of the vehicle; and a processor disposed inside or outside the antenna module, and configured to communicate with at least one of an adjacent vehicle, a road side unit (RSU), and a base station, wherein the antenna module comprises:

a printed circuit board (PCB) including electronic components are disposed;

a metal heat sink disposed below the PCB to absorb heat generated from at least one of the electronic components;

a blower fan structure disposed above the PCB and having a blower fan to dissipate heat generated from the at least one of the electronic components;

a dielectric carrier coupled to the blower fan structure and having a hole formed to correspond to an area occupied by the blower fan; and an antenna element formed as a metal pattern on a top of the dielectric carrier to radiate a radio signal to a top region.

17. The vehicle of claim 16, wherein the antenna element comprises:

an upper metal pattern formed as a polygonal metal pattern and having an aperture region formed inside the metal pattern to correspond to the hole of the dielectric carrier; and a feed pattern formed perpendicular to the upper metal pattern at a first point of the upper metal pattern and configured to feed a signal from the PCB to the upper metal pattern; and a side metal pattern formed on a side surface of the dielectric carrier to be perpendicular to the upper metal pattern at a second point of the upper metal pattern, and spaced apart from the ground.

18. The vehicle of claim 16, wherein the antenna modules comprises:

a bottom cover disposed below the PCB and configured as a metal plate; and a top cover fastened to the bottom cover and configured to accommodate the heat sink, the PCB, the blower fan, and the antenna element therein, wherein the heat sink comprises:

a plate configured to be fastened to the bottom cover; and a rib structure formed in a top region of the plate to be adjacent to an aperture region formed in one side region of the dielectric carrier, wherein air generated by the blower fan is discharged through a side region of the top cover via the aperture region and the rib structure, and wherein a radio signal is radiated from the antenna element through a top region of the top cover.

19. The vehicle of claim 16, further comprising:

a network access device (NAD) disposed on a rear region of the PCB and operably coupled to the antenna element to control a signal applied to the antenna element; and a thermoelectric cooler (TEC) disposed between the NAD and the heat sink, wherein heat emitted from the NAD is dissipated to a bottom region of the antenna module through the thermoelectric cooler, a plate of the heat sink, and the bottom cover, and dissipated by air generated by the blower fan through a side region of the top cover via an aperture region and a rib structure.

20. The vehicle of claim 16, wherein the antenna element is a first antenna formed on the dielectric carrier disposed on one side region of the PCB, wherein the antenna element further comprises a second antenna formed on a second dielectric carrier disposed on another side region of the PCB, and wherein the NAD applies a signal to one of the first antenna and the second antenna to receive a signal through the second antenna when quality of a signal received through the first antenna is below a threshold, performs a multi-input/multi-output (MIMO) or diversity operation through the first antenna and the second antenna in a first band, and performs the MIMO or diversity operation through the first antenna and the second antenna in a second band different from the first band when first signal quality of the first band is below the threshold.

* * * * *